US009438767B2

(12) United States Patent
Yamazaki et al.

(10) Patent No.: US 9,438,767 B2
(45) Date of Patent: Sep. 6, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Taeko Yamazaki, Kawasaki (JP); Tetsuomi Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/669,972

(22) Filed: Mar. 26, 2015

(65) Prior Publication Data
US 2015/0288853 A1 Oct. 8, 2015

(30) Foreign Application Priority Data

Apr. 2, 2014 (JP) ................... 2014-076079

(51) Int. Cl.
*H04N 1/04* (2006.01)
*H04N 1/40* (2006.01)
*H04N 1/403* (2006.01)

(52) U.S. Cl.
CPC .................. *H04N 1/40* (2013.01); *H04N 1/04* (2013.01); *H04N 1/403* (2013.01)

(58) Field of Classification Search
CPC ..................... G06K 2209/01; G06K 9/00456; G06K 9/346; G06K 9/00442; G06K 9/00013; G06K 9/03; G06K 9/2018; G06K 9/3233; G06K 9/344; G06K 9/44; G06K 9/4652; G06K 9/3283; H04N 1/6072; H04N 1/56; H04N 1/40

USPC ............ 358/1.9, 518, 3.26, 3.27, 474, 3.21, 358/448, 462, 539, 1.11, 463, 466, 470, 358/505, 509, 515, 529, 540, 1.15, 1.16, 358/488, 523, 1.2; 382/170, 176, 190, 203, 382/165, 173; 399/262, 106, 120, 18, 202
See application file for complete search history.

(56) References Cited

U.S. PATENT DOCUMENTS

| 5,956,421 | A | 9/1999 | Tanaka |
|---|---|---|---|
| 7,386,168 | B2 | 6/2008 | Misawa |
| 7,437,002 | B2 | 10/2008 | Tanaka |
| 2005/0058341 | A1* | 3/2005 | Maruoka ................ 382/167 |
| 2005/0180645 | A1* | 8/2005 | Hasegawa et al. .......... 382/239 |
| 2007/0172137 | A1* | 7/2007 | Mori ........................ 382/239 |
| 2008/0244456 | A1* | 10/2008 | Shimizu ............... G06F 3/0481 715/840 |

(Continued)

FOREIGN PATENT DOCUMENTS

JP  2004-260327  9/2004

*Primary Examiner* — Negussie Worku
(74) *Attorney, Agent, or Firm* — Fitzpatrick, Cella, Harper & Scinto

(57) ABSTRACT

Image compression that keeps a balance between improvement in visual recognizability by highlighting a character color of a reversed character and a reduction in an apparent difference between an input image and a restored image is implemented. An image processing apparatus including a specifying unit configured to specify a character within an image, a setting unit configured to set a representative color to the specified character by using colors of pixels constituting the specified character, a determination unit configured to determine whether the specified character is a reversed character, and a correction unit configured to correct the set representative color in the case where the specified character is determined to be a reversed character.

19 Claims, 21 Drawing Sheets

(56) References Cited

U.S. PATENT DOCUMENTS

| | | | |
|---|---|---|---|
| 2009/0234820 A1* | 9/2009 | Kaburagi | G06F 17/30554 |
| 2009/0324080 A1* | 12/2009 | Yamazaki | G06K 9/00442 382/176 |
| 2010/0054586 A1* | 3/2010 | Yamazaki | G06K 9/342 382/164 |
| 2010/0054587 A1* | 3/2010 | Fukuoka | G06K 9/342 382/164 |
| 2010/0232690 A1* | 9/2010 | Kanatsu | G06F 17/30011 382/165 |
| 2010/0324080 A1* | 12/2010 | Kyle | C07D 221/26 514/295 |
| 2010/0329551 A1* | 12/2010 | Yamazaki | G06K 9/342 382/165 |
| 2011/0116813 A1* | 5/2011 | Okamoto | G03G 15/6535 399/16 |
| 2011/0141501 A1* | 6/2011 | Shirata | 358/1.9 |
| 2011/0227952 A1* | 9/2011 | Hamaguchi | G09G 5/16 345/672 |
| 2012/0062914 A1* | 3/2012 | Iwamoto | 358/1.9 |
| 2012/0114230 A1* | 5/2012 | Dai | G06K 9/00456 382/164 |
| 2012/0134581 A1* | 5/2012 | Matsuda | H04N 1/56 382/164 |
| 2012/0163877 A1* | 6/2012 | Kikuchi | G03G 15/0886 399/262 |
| 2013/0039537 A1* | 2/2013 | Yamazaki | G06T 11/00 382/103 |
| 2014/0355896 A1* | 12/2014 | Osada | 382/229 |

\* cited by examiner

IMAGE PROCESSING APPARATUS, IMAGE PROCESSING METHOD, AND STORAGE MEDIUM

BACKGROUND OF THE INVENTION

1. Field of the Invention

The present invention relates to an image processing technique to compress and decompress a multivalued image.

2. Description of the Related Art

In recent years, with the spread of scanners, electronization of documents is in progress. In the case where electronized document data is saved in a full-color bitmap format, for example, for an A4-size document, the data size will be about 24 Mbytes with a read resolution of 300 dpi. This means that the capacity of a necessary memory will become very large and the size of the data is too large to transmit as an attachment to an email, and therefore, it is requested to reduce the data capacity as much as possible.

Consequently, in order to reduce the data capacity, usually, a read image (full-color image) is compressed and as a compression method, JPEG is known. JPEG is very effective for compression of a natural image such as a photo, but it is known that a deterioration in an image, called mosquito noise, occurs in the case where a character portion is compressed by JPEG. In order to solve this problem, a method has been proposed conventionally, which divides an input full-color image into a character area and a photo area and the character area is binarized and then compressed by MMR and the photo area is compressed by JPEG, and thereby, the data size is reduced while keeping the quality of the character area.

The above-described conventional method is characterized in that the white portion of the binary image is caused to show through the JPEG image and the black portion is represented by characters colored in a representative color determined for each character or for each character area at the time of decompression. Due to this, it is made possible to remove variations caused by scanner reading of the character portion originally represented in a single color. In addition to this, a high quality and highly compressed image is obtained by using a compression system. In order for this method to implement high image quality, extracting an appropriate representative color from the characters of the character area portion will be important. As to this point, there has been such a problem that the color of the background may permeate into the character due to the variations caused by scanner reading or the action of compression, and the color of the character area in the input image in which such permeation has occurred is reproduced (extracted) as it is at the time of color extraction.

For such a problem in the color extraction technique, it has been proposed to allocate a predetermined color (e.g., white) to a reversed character whose color distance between the average color of the unit character and the representative color is within a predetermined range at the time of allocating the representative color of the character to the unit character (Japanese Patent Laid-Open No. 2004-260327).

The technique proposed in Patent Document 1 of Japanese Patent Laid-Open No. 2004-260327 is the technique to set a predetermined color that is more highlighted than the original character color as the representative color of the character in order to improve visual recognizability of the character. Then, for example, also in the case where the character within the input image is a reversed character and the color of the reversed character is a pale color other than white, the predetermined color (e.g., white) is allocated as the character representative color.

In other words, in the case of Japanese Patent Laid-Open No. 2004-260327 described above, to the reversed character area other than white as described above, a color different from the original color of the reversed character is allocated as the character representative color. Further, in the case of an input image in which the reversed character area having a pale character color occupies the majority of the image, there will be produced a large apparent difference between the image in the state before compression (input image) and the image in the state after decompression (restored image).

SUMMARY OF THE INVENTION

The image processing apparatus according to the present invention is an image processing apparatus and includes a specifying unit configured to specify a character within an image, a setting unit configured to set a representative color to the specified character by using the colors of pixels constituting the specified character, a determination unit configured to determine whether the specified character is a reversed character, and a correction unit configured to correct the set representative color in the case where the specified character is determined to be a reversed character.

According to the present invention, it is made possible to perform image compression that keeps a balance between improvement in visual recognizability by highlighting the character color of a reversed character and a reduction in an apparent difference between an input image and a restored image.

Further features of the present invention will become apparent from the following description of exemplary embodiments (with reference to the attached drawings).

DESCRIPTION OF THE EMBODIMENTS

Hereinafter, with reference to the attached drawings, the present invention is explained in detail in accordance with preferred embodiments. The configurations shown in the following embodiments are just an example and the present invention is not limited to the configurations shown schematically.

First Embodiment

Figure 1:
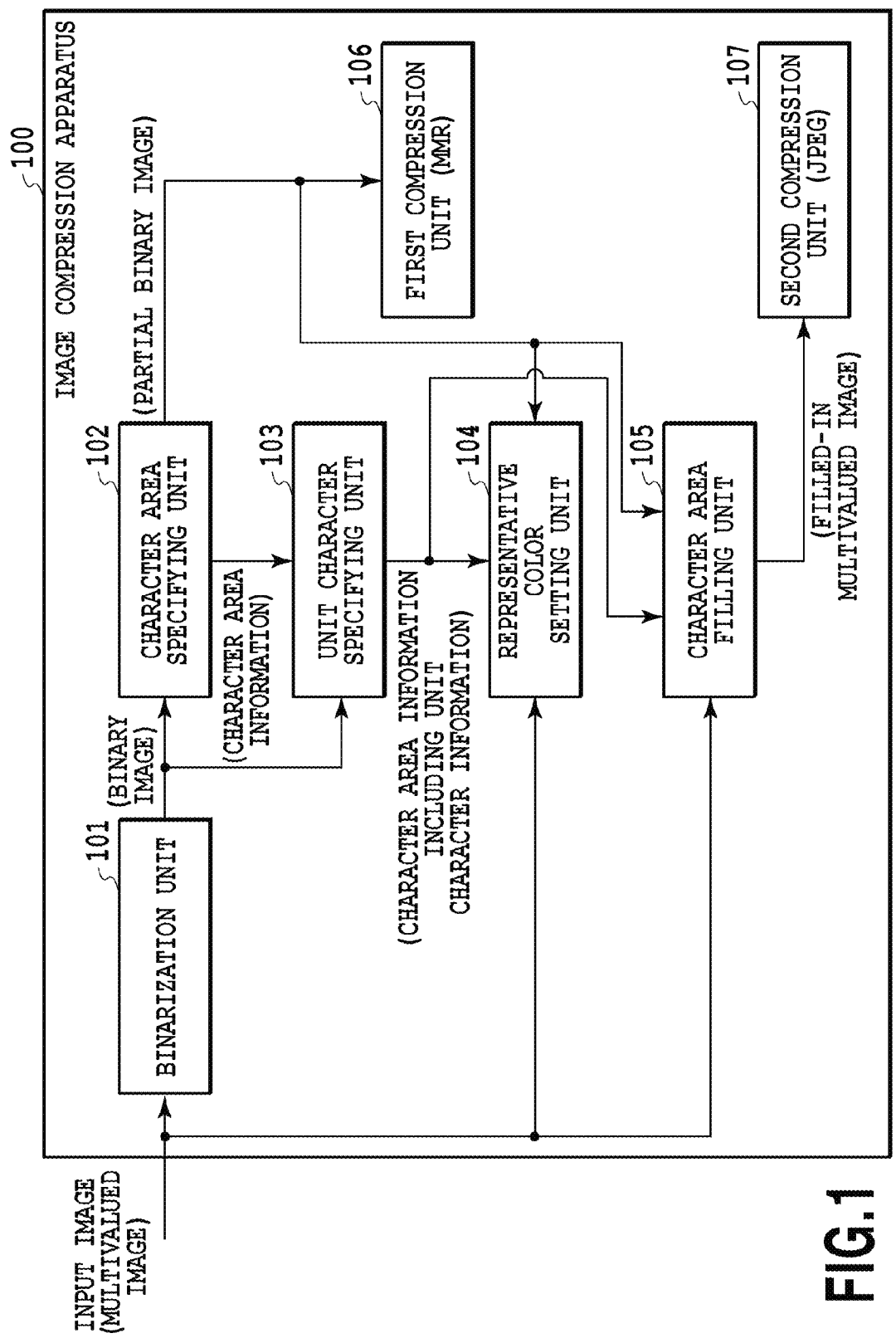
FIG. 1 is a function block diagram showing an internal configuration of an image processing apparatus as an image compression apparatus according to a first embodiment.

FIG. 1 is a function block diagram showing an internal configuration of an image processing apparatus as an image compression apparatus for compressing a multivalued image read by a scanner or the like, according to the present embodiment. An image compression apparatus 100 includes a binarization unit 101, a character area specifying unit 102, a unit character specifying unit 103, a representative color setting unit 104, a character area filling unit 105, a first compression unit 106, and a second compression unit 107.

The binarization unit 101 binarizes a color multivalued image (hereinafter, simply referred to as a "multivalued image") as an input image. The generated binary image is sent to the character area specifying unit 102 and the unit character specifying unit 103.

The character area specifying unit 102 specifies a character area by performing contour tracking processing or the like of pixels having a predetermined value (e.g., black pixels) on the binary image received from the binarization unit 101 and generates information for identifying a character area (hereinafter, character area information). The character area information includes attribute information indicative of whether the character within the character area is a reversed character, in addition to the information, such as the position (coordinates) and size of the character area and the number of pixels having a predetermined value. Because the character area is specified by the character area information, the position and size of an area (natural image area showing a natural (tone level) image, such as a photo and an illustration) other than the character area are also specified. Further, the character area specifying unit 102 also generates a binary image for each character area (hereinafter, a partial binary image) based on the generated character area information. Then, the character area information is sent to the unit character specifying unit 103 and the partial binary image is sent to the representative color setting unit 104, the character area filling unit 105, and the first compression unit 106.

The unit character specifying unit 103 specifies the position and size of each individual character (hereinafter, a unit character) within the character area by using the binary image received from the binarization unit 101 and the character area information received from the character area specifying unit 10. In order to simplify explanation, in the present embodiment, it is assumed that information indicative of the position and size of each specified unit character (hereinafter, unit character information) is added to the character area information. The character area information to which the unit character information has been added is sent to the representative color setting unit 104 and the character area filling unit 105.

The representative color setting unit 104 sets a representative color for each character area based on the multivalued image, which is the input image, the partial binary image received from the character area specifying unit 102, and the character area information (including the unit character information) received from the unit character specifying unit 103. In other words, the representative color setting unit 104 generates information indicative of a representative color in the character area (hereinafter, character representative color information) by setting the representative color to each unit character in the character area while associating the black pixel portion in the partial binary image with the position corresponding to the black pixel on the multivalued image.

The character area filling unit 105 performs filling processing based on the multivalued image, which is the input image, the partial binary image received from the character area specifying unit 102, and the character area information received from the unit character specifying unit 103 and generates a filled-in multivalued image. Specifically, the character area filling unit 105 performs processing to replace the color of a character pixel of the unit character area with the color of the adjacent pixels, i.e., the background color for each character area on the multivalued image and generates an image from which characters have been deleted.

The first compression unit 106 performs compression processing by the MMR method on the partial binary image received from the character area specifying unit 102 and generates an MMR-compressed code (first compressed code). The compression method in the first compression unit may be any compression method suitable to a binary image and, for example, another compression method, such as JBIG, MR, and MH, may be used.

The second compression unit 107 performs compression processing by the JPEG method on the filled-in multivalued image received from the character area filling unit 105 and generates a JPEG-compressed code (second compressed code).

As the results of the processing performed by each unit as above, compressed data of the input image including the character area information (including unit character information), the MMR-compressed code, the character representative color information, and the JPEG-compressed code is generated. The generated compressed code may be further reversibly compressed into PDF etc. In the case where no character area exists in the input image, the compressed data includes only the JPEG-compressed code as a result.

The above-described image compression apparatus (also an image decompression apparatus, to be described later) is implemented by a general-purpose computer such as a personal computer. Then, the general-purpose computer includes a CPU, a RAM, a ROM, a hard disc, an external storage apparatus, a network interface, a display, a keyboard, a mouse, etc., as the standard components. Further, the image compression apparatus may be implemented as dedicated hardware that is implemented as an extension card for the general-purpose computer. Specific examples of an apparatus that mounts the image compression apparatus are a multifunction peripheral (apparatus having the functions as a copying machine, a printer, a scanner, a facsimile, etc.) having a network communication function, a color scanner, a color facsimile, etc.

Next, among the units of the image compression apparatus 100, the binarization unit 101, the character area specifying unit 102, the unit character specifying unit 103, the representative color setting unit 104, and the character area filling unit 105 are explained in detail, respectively.

First, the binarization processing in the binarization unit 101 is explained.

Figure 2:
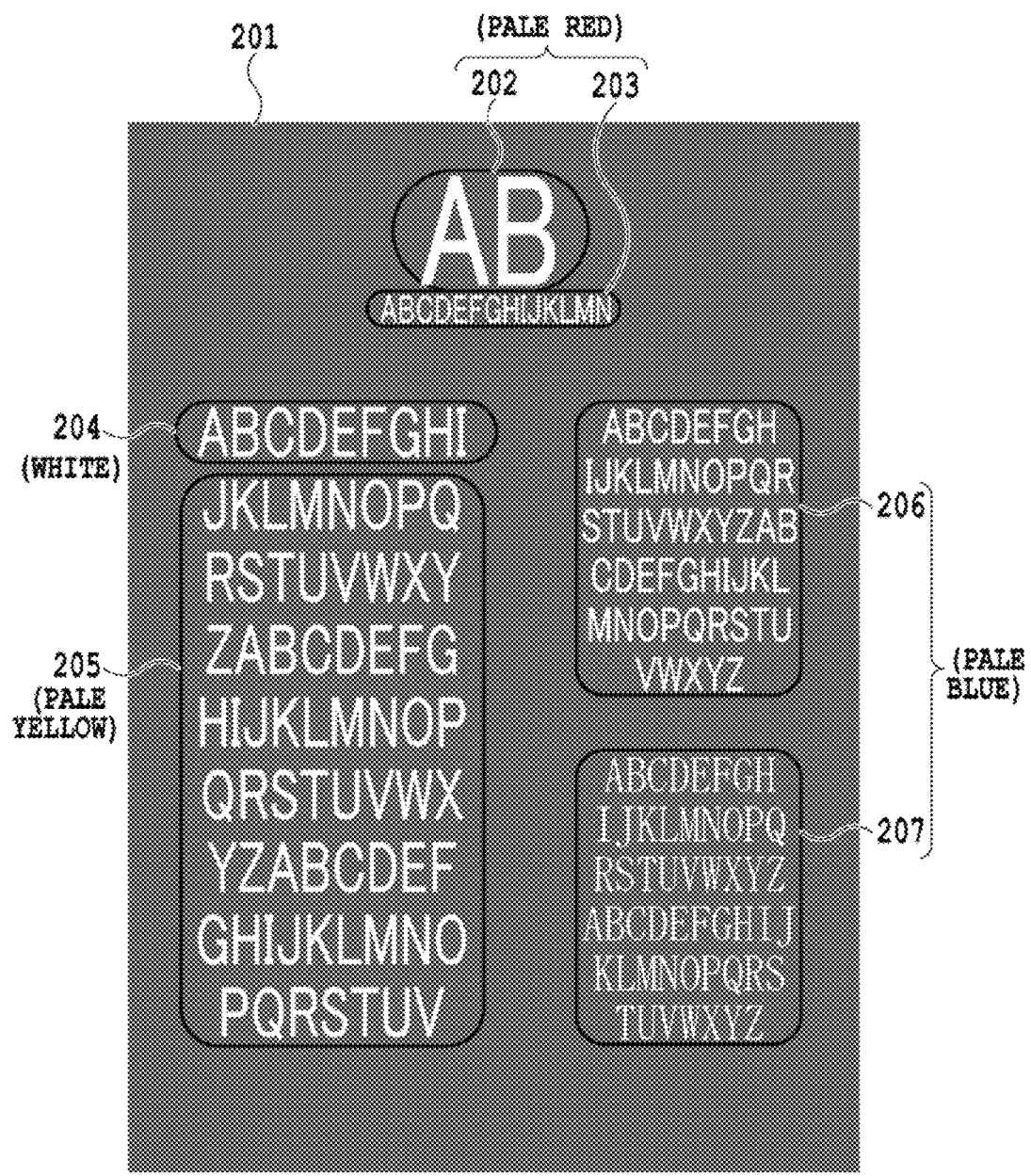
FIG. 2 is a diagram showing an example of an input image.

FIG. 2 is a diagram showing an example of an input image that is a target of the binarization processing. In FIG. 2, an input image 201 is a multivalued image and the color of the background of the input image 201 is deep gray. It is assumed that the color of reversed characters in character areas 202 and 203 is pale red, the color of reversed characters in a character area 204 is white, the color of reversed characters in a character area 205 is pale yellow, and the color of reversed characters in character areas 206 and 207 is pale blue. In the present embodiment, it is assumed that the input image 201 is image data read by a scanner. Usually, an image read by a scanner is thought to include variations at the time of read and deterioration due to the JPEG compression, but it is needless to say that an image not including such deterioration is also the target of the present embodiment.

Figure 3:
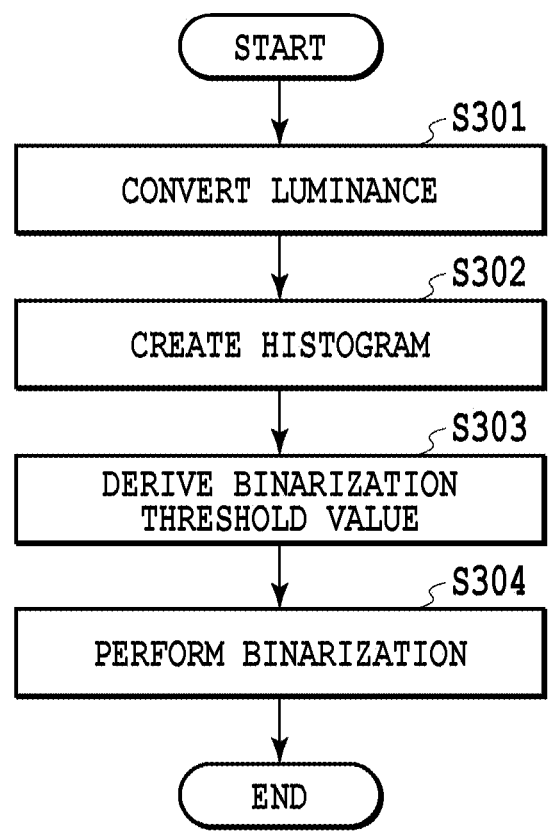
FIG. 3 is a flowchart showing a flow of binarization processing.

FIG. 3 is a flowchart showing a flow of the binarization processing. The contents to be described below are implemented by the CPU reading programs stored in the hard disk or the like onto the RAM and executing the programs.

At step 301, the binarization unit 101 generates a luminance image from a multivalued image (e.g., 24-bit RGB data) obtained by reading an image with a scanner. Specifically, conversion into luminance Y is performed by expression (1) below.

$$Y = 0.299 \times R + 0.587 \times G + 0.114 \times B \quad \text{expression (1)}$$

Figure 4:
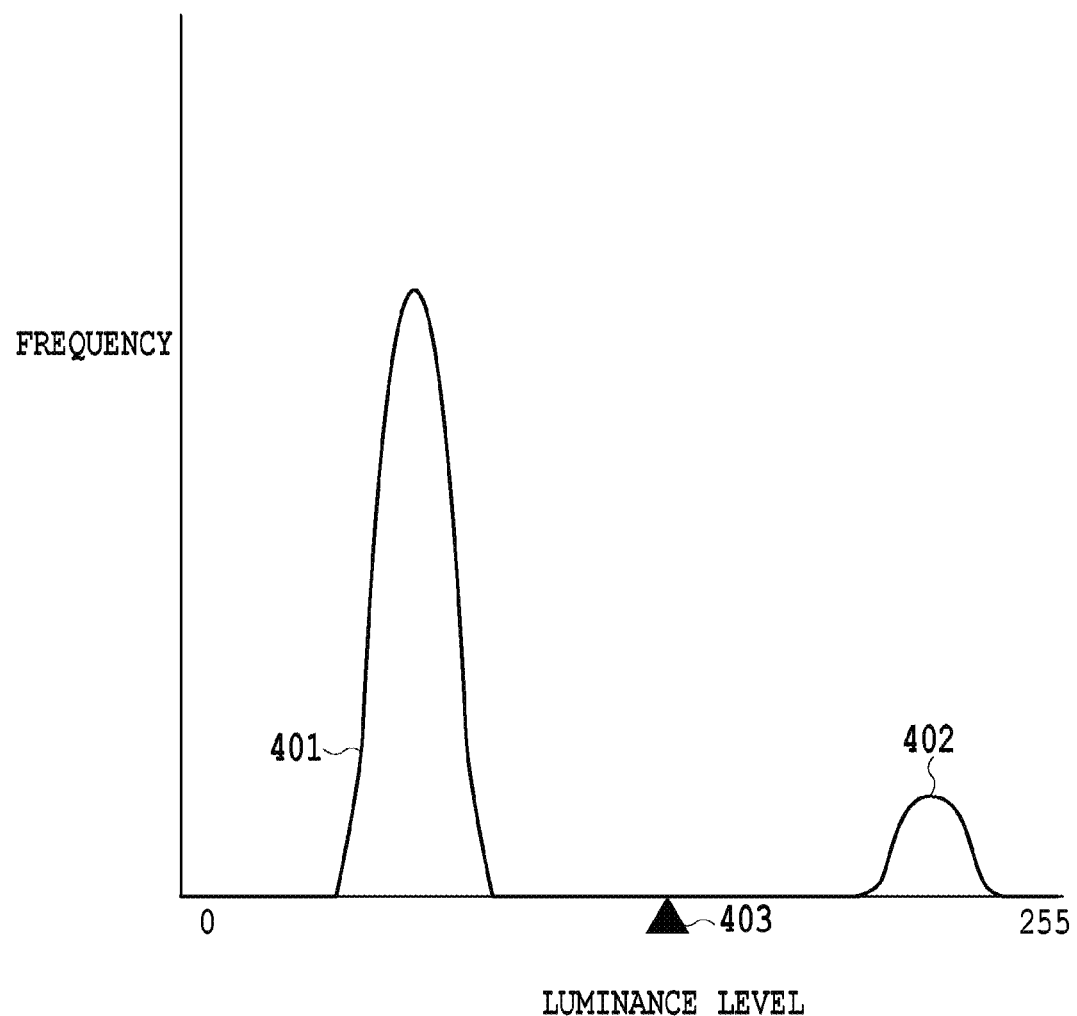
FIG. 4 is a diagram showing an example of a histogram of a luminance image.

At step 302, the binarization unit 101 creates a histogram of the entire surface of the generated luminance image. FIG. 4 is a diagram showing an example of a histogram of a luminance image. In FIG. 4, the horizontal axis represents the luminance level (0 to 255) of the Y signal and the vertical axis represents the frequency of appearance thereof. In the case of the histogram in FIG. 4, a distribution curve 401 indicates the distribution of the background and a distribution curve 402 indicates the distribution of the characters. A triangular black mark 403 indicates a middle point between the vertex of the distribution curve 401 of the background and the vertex of the distribution curve 402 of the characters.

At step 303, the binarization unit 101 derives an optimum binarization threshold value T. The method of deriving the binarization threshold value T is not limited in particular and, for example, the middle point indicated by the triangular black mark 403 described above is derived as the binarization threshold value T.

At step 304, the binarization unit 101 binarizes the luminance image generated at step 301 based on the binarization threshold value T derived at step 303 and generates a binary image.

Figure 5:
FIG. 5 is a diagram showing a binary image obtained by binarization processing.

The above is the contents of the binarization processing. FIG. 5 shows a binary image obtained by binarizing the input image 201 in FIG. 2 and the image is such that the background portion is represented in black and the reversed character portions are represented in white.

Next, character area specifying processing in the character area specifying unit 102 is explained.

Figure 6:
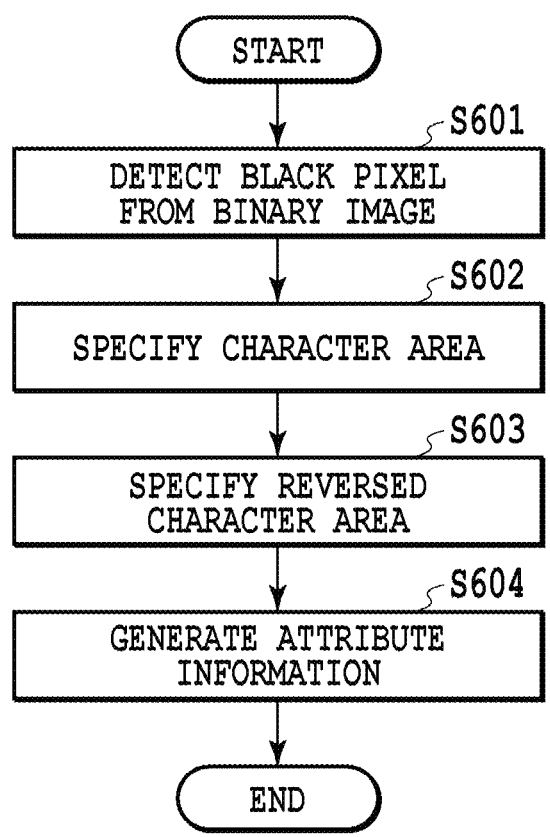
FIG. 6 is a flowchart showing a flow of character area specifying processing.

FIG. 6 is a flowchart showing a flow of the character area specifying processing. The contents to be described below are implemented by the CPU reading programs stored in the hard disk or the like onto the RAM and executing the programs.

At step S601, the character area specifying unit 102 detects a portion of a black pixel by using a technique, such as the publicly-known black pixel contour tracking processing and the labeling processing, from the binary image generated in the binarization unit 101.

At step 602, the character area specifying unit 102 specifies a character area (its position and size) based on the detection results at step 601. Specifically, among aggregations of pixels surrounded by the black pixel contour, from an aggregation of black pixels having a large area, an aggregation of white pixels is extracted by performing contour tracking also for white pixels located inside thereof, and further, from the inside of the aggregation of white pixels having an area equal to or larger than a fixed area, the aggregation of black pixels is extracted recursively. The aggregations of black pixels thus obtained are classified according to size and shape. For example, the aggregation whose aspect ratio is near to one and whose size is in a fixed range is classified as a pixel aggregation corresponding to a character and the portion where adjacent characters are well aligned and can be grouped is specified as a character area.

At step 603, the character area specifying unit 102 determines whether the character area specified at step 603 is a reversed character area. Specifically, first, the number of black pixels and the number of white pixels within the character area are compared. Then, in the case where the number of black pixels is larger than the number of white pixels, whether the size of coupled white pixels is within a range of the character size determined in advance is checked. In the case where the results indicate that the size of the coupled white pixels is within the range of the character size determined in advance, the character area is specified as a reversed character area.

At step 604, the character area specifying unit 102 generates attribute information in accordance with the results of the processing at step 603. In other words, for the area specified as a character area, information on the type indicative of whether or not the character area is a reversed character area is generated as attribute information along with information on the position and size of the character area. For the area specified as an area other than the character area, attribute information indicative of a natural image area is generated. The attribute information thus generated is stored in the RAM or the like.

Figure 7:
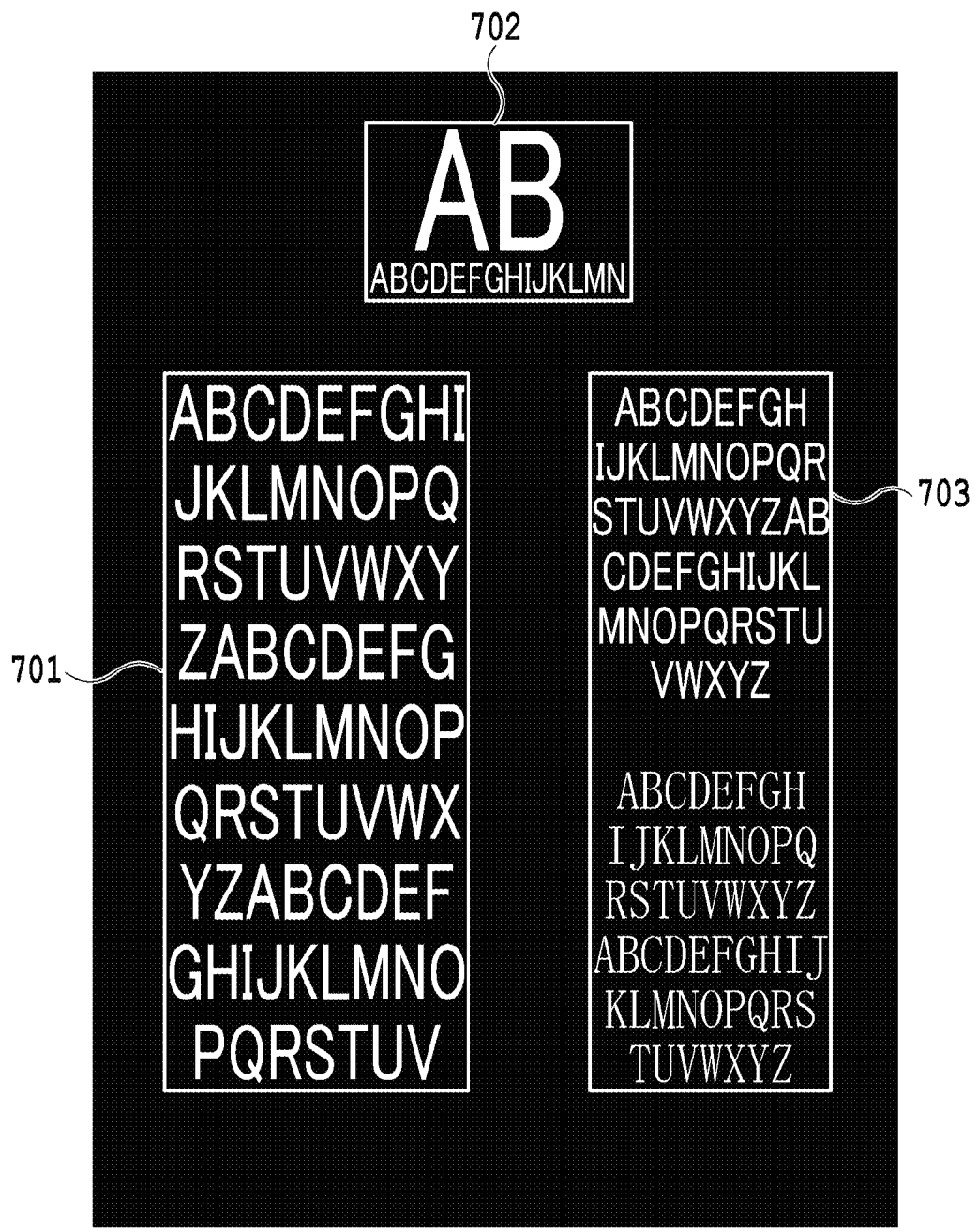
FIG. 7 is a diagram showing the results of performing character area specifying processing on a binary image.

The above is the contents of the character area specifying processing. FIG. 7 shows the results of performing the character area specifying processing on the binary image shown in FIG. 5. In FIG. 7, areas 701 to 703 surrounded by the white frame indicate the specified character areas (all the character areas are reversed character areas here).

Figure 8:
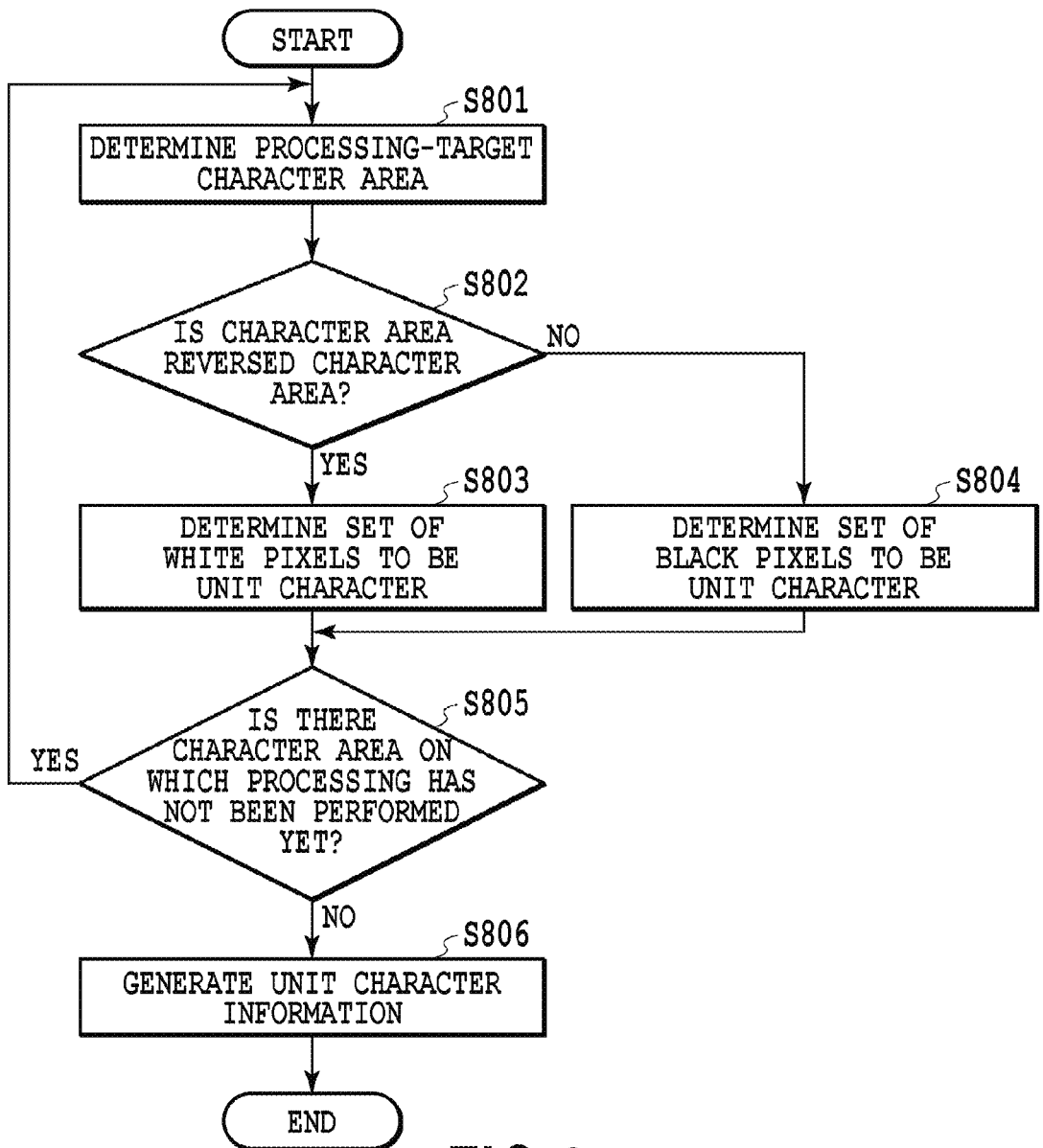
FIG. 8 is a flowchart showing a flow of unit character specifying processing.

Next, unit character specifying processing in the unit character specifying unit 103 is explained. FIG. 8 is a flowchart showing a flow of the unit character specifying processing. The contents to be described below are implemented by the CPU reading programs stored in the hard disk or the like onto the RAM and executing the programs.

At step 801, the unit character specifying unit 103 determines a character area for which the processing is performed. In the case of FIG. 7 described above, one of the character areas 701 to 703 is determined to be the processing-target character area.

At step 802, the unit character specifying unit 103 refers to the attribute information included in the character area information and determines whether the processing-target character area is a reversed character area. In the case where the results of the determination indicate that the processing-target character area is a reversed character area, the processing proceeds to step 803. On the other hand, in the case where the processing-target character area is not a reversed character area, the processing proceeds to step 804.

At step 803, the unit character specifying unit 103 determines a set of pixels having a predetermined pixel value indicating a white pixel as a unit character.

At step 804, the unit character specifying unit 103 determines a set of pixels having a predetermined pixel value indicating a black pixel as a unit character.

At step 805, the unit character specifying unit 103 determines whether or not there is a character area on which the processing has not been performed yet. In the case where there is a character area on which the processing has not been performed yet, the processing returns to step 801, the next character area is determined to be the processing-target character area, and the processing at step 802 to step 805 is repeated. On the other hand, in the case where the processing for all the character areas has been completed, the processing proceeds to step 806.

At step 806, the unit character specifying unit 103 generates information (unit character information) indicative of the position, the size, the number of pixels, the presence/absence of reversion, etc., for each of the unit characters determined at steps 803 and 804. The unit character information thus generated is stored in the RAM or the like.

Figure 9:
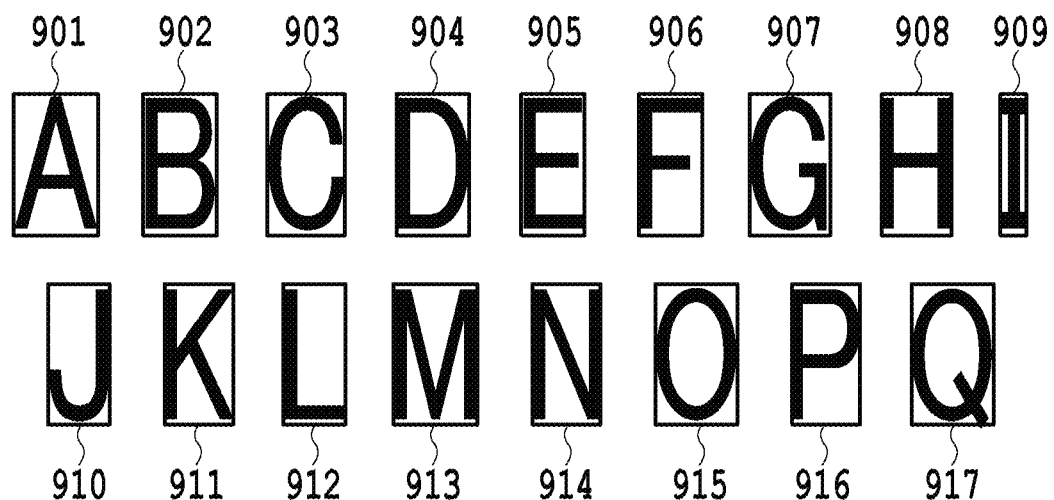
FIG. 9 is a diagram showing (part of) the results of performing unit character specifying processing.

FIG. 9 shows (part of) the results of performing the unit character specifying processing on the character area 701 in FIG. 7. In FIG. 9, rectangles 901 to 917 corresponding to each character of alphabets "A to Q" are the specified unit characters. Although the character area 701 is the reversed character area, in FIG. 9 white and black are reversed for convenience of explanation. Similarly, the processing to specify a unit character is performed also on the other character areas 702 and 703.

The above is the contents of the unit character specifying processing.

Next, the representative color setting processing in the representative color setting unit 104 is explained. As described above, the representative color setting unit 104 acquires character area information, a partial binary image, and a multivalued image as an input. In this case, it is assumed that the partial binary image, which is obtained by cutting off the character area of the binary image, is stored in the RAM or the like. It is also assumed that the multivalued image is stored in the RAM or the like similarly. In the present embodiment, an input image is handled as the target of processing as it is, but it may also be possible to use an image (compressed multivalued image) obtained by compressing an input image as the target of processing. The degree of compression (compression ratio) at this time is set to an arbitrary value in accordance with the purpose and use.

Figure 10:
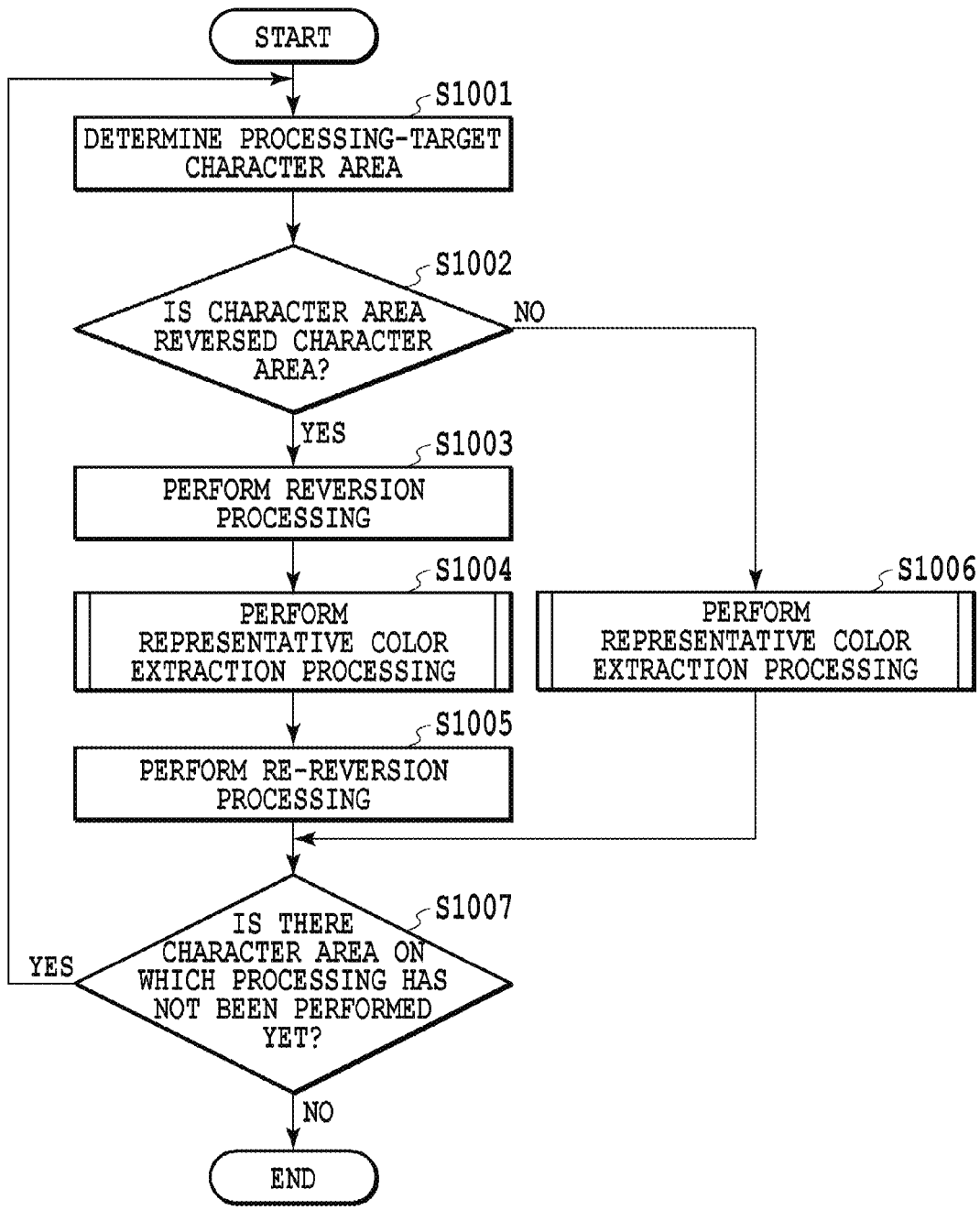
FIG. 10 is a flowchart showing a flow of representative color setting processing.

FIG. 10 is a flowchart showing a flow of the representative color setting processing. The contents to be described below are implemented by the CPU reading programs stored in the hard disk or the like onto the RAM and executing the programs.

At step 1001, the representative color setting unit 104 determines a character area that is the target of processing (=partial binary image). For example, in the case of FIG. 7 described above, one of the character areas 701 to 703 is determined to be a character area that is the target of processing.

At step 1002, the representative color setting unit 104 refers to the attribute information within the character area information and determines whether or not the processing-target character area is a reversed character area. In the case where the results of the determination indicate that the processing-target character area is a reversed character area, the processing proceeds to step 1003. On the other hand, in the case where the processing-target character area is not a reversed character area, the processing proceeds to step 1006.

At step 1003, the representative color setting unit 104 reverses the colors by performing color reversion processing on the partial binary image corresponding to the processing-target character area (reversed character area). For example, in the case of a white character whose background is black (so-called solid-white character), the white character is reversed into a black character whose background is white. The reason the reversion processing is performed on the reverted character area is that the conditions are made the same as those of the processing that is performed on the normal character area so that the same algorithm can be applied in common.

Figure 11:
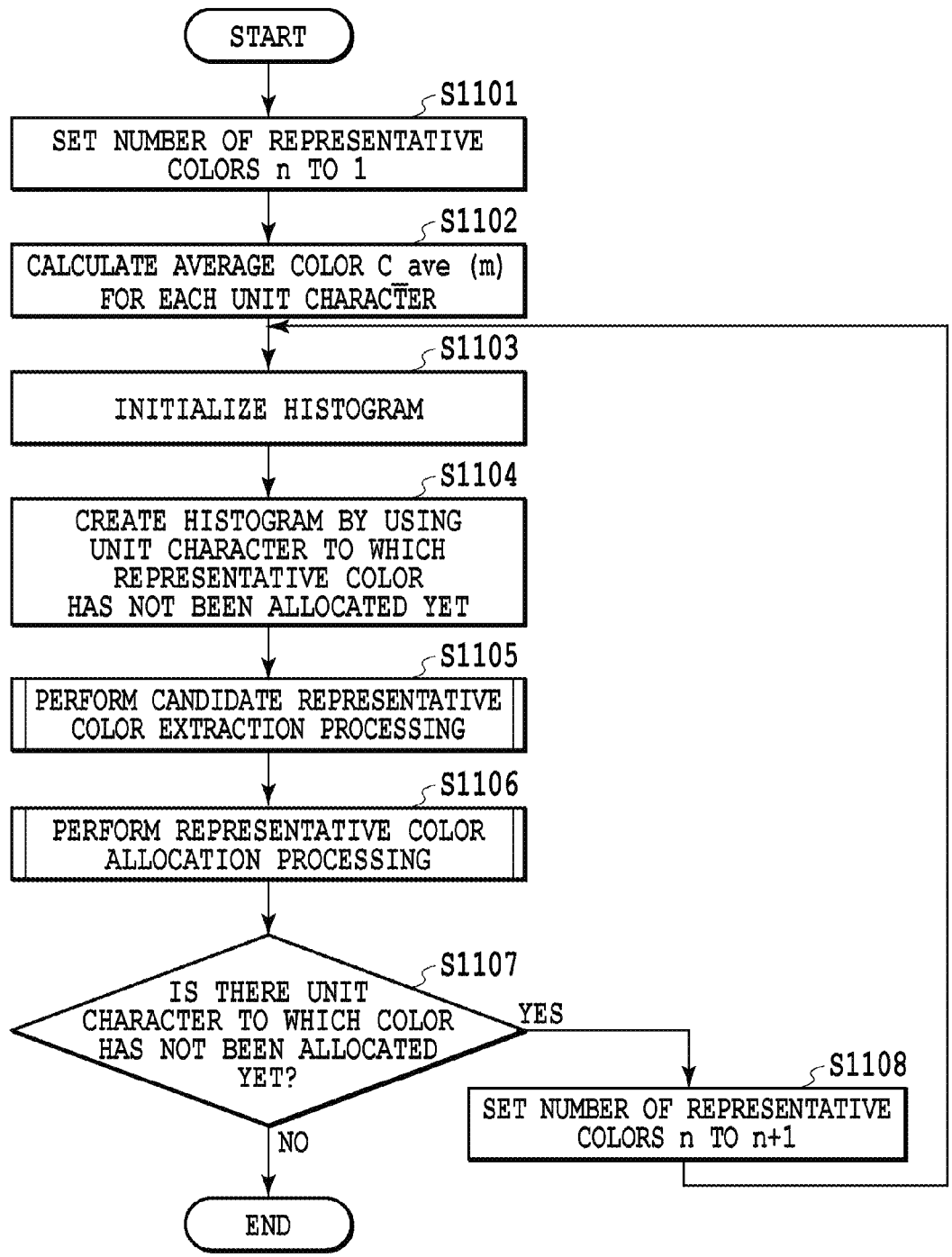
FIG. 11 is a flowchart showing a flow of representative color extraction processing.

At step 1004, the representative color setting unit 104 performs representative color extraction processing on the processing-target character area (reversed character area). FIG. 11 is a flowchart showing a flow of the representative color extraction processing. As described above, the target of the representative color extraction processing is both the normal character area and the reversed character area. Here, explanation is given by taking the case where the reversed character area 701 in FIG. 7 is the target of the processing as an example. The terms that are used in explanation are defined as follows.

An average of color information of pixels in a multivalued image corresponding to pixels in a unit character portion within a character area is referred to as an average color C_ave (m). Here, m is a numerical value for uniquely identifying the unit character in the character area and in the case where M unit characters exist in the character area, the range that m takes will be 1≤m≤M.

A candidate representative color within the character area is denoted by C' (n). Here, n represents the number of representative colors in the character area. For example, there are two kinds of color, i.e., white and pale yellow, for the colors of characters of the multivalued image corresponding to the character area 701, and therefore, n is 2. The initial value of n is 1 and in the stage where the representative color extraction processing is completed, the number of candidate representative colors n is fixed.

A candidate representative color allocated for each unit character is expressed as a representative color C_q (m). Here, m is a numerical value for uniquely identifying the unit character in the character area and indicates the unit character in the same position of m that is used in C_ave (m).

At step 1101, the representative color setting unit 104 sets 1 to the number of representative colors n in the character area. This means that "the representative color of the first color is extracted".

At step 1102, the representative color setting unit 104 calculates the average color C_ave (m) of RGB for each unit character while referring to the character area information and colors (RGB) of the multivalued image corresponding to the positions of the black pixels of the partial binary image. The calculated average color C_ave (m) of RGB for each unit character may be converted into a color space, for example, such as YCbCr that can be represented by the luminance Y and color differences CbCr. The color space may be another color space, such as Lab and Yuv, but in the present embodiment, explanation is given by using the case where RGB is converted into YCbCr as an example. The conversion expression from RGB into YCbCr is omitted.

At step 1103, the representative color setting unit 104 initializes a histogram as preparation for creating a histogram (clears a memory area to create a histogram).

Figure 12:
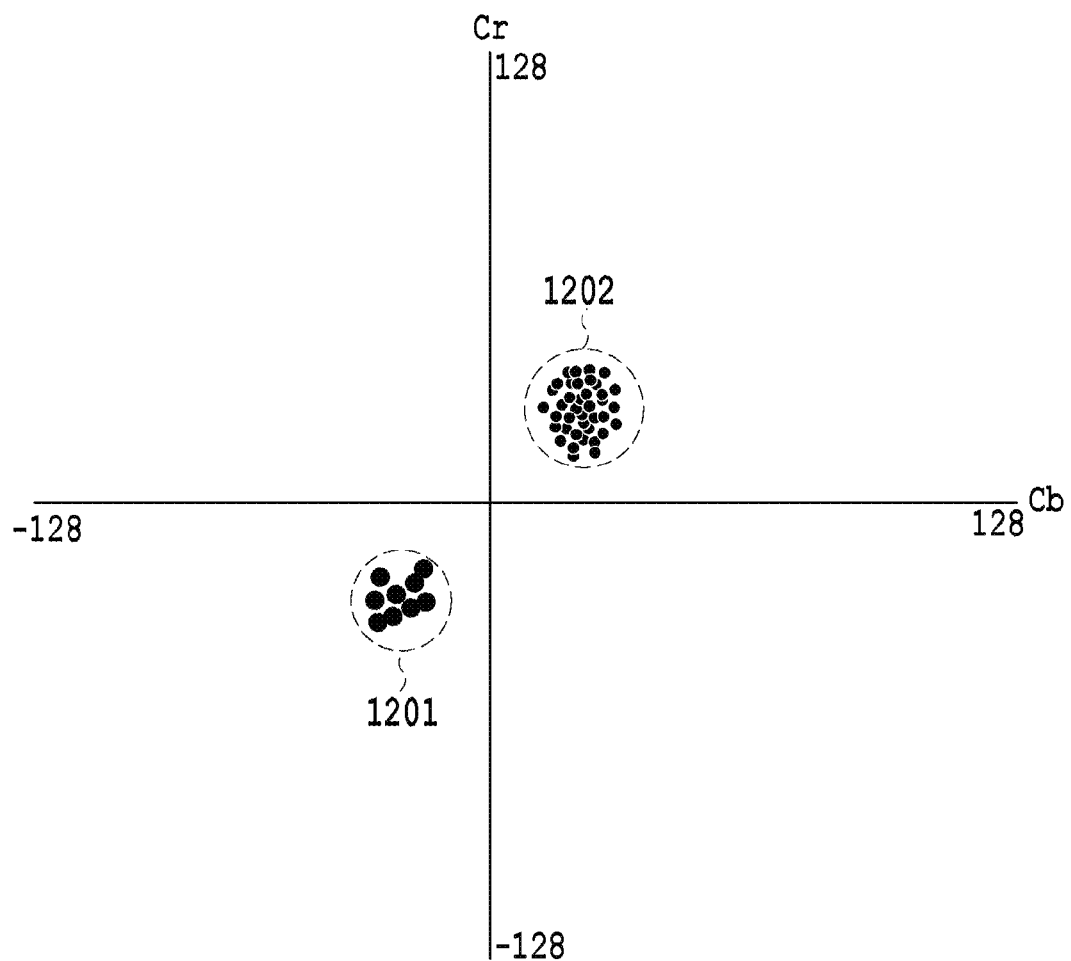
FIG. 12 is a diagram showing a histogram.

At step 1104, the representative color setting unit 104 creates a two-dimensional histogram of the color differences CbCr by using only unit characters whose C_q (m) is NULL, i.e., to which a representative color has not been allocated yet. In the stage immediately after the start of processing on a certain character area, the representative color is not allocated to any of the unit characters within the character area, and therefore, a histogram is created by using C_ave (m) of all the unit characters (in the character area 701, the 74 alphabets). FIG. 12 shows a histogram that is created by the first-time processing on the character area 701 in FIG. 7. In FIG. 12, a plot group 1201 represents a set in which the average color C_ave of each unit character of the unit characters 901 to 909 is plotted and a plot group 1202 represents a set in which the average color C_ave of each unit character of the unit character 910 and the subsequent unit characters is plotted. Here, the reason there is a distance between the plot group 1201 and the plot group 1202 is that there is a difference between the color (white) of the character area 204 and the color (pale yellow) of the character area 205 in the input image (color multivalued image) 201 shown in FIG. 2. Further, the magnitude of the distance between the plot points within the plot group 1201 or the magnitude of the distance between the plot points within the plot group 1202 represents the variations in the input image read by a scanner or the variations due to the processing (e.g., JPEG compression) thereafter. The unit characters (reversed unit characters) 901 to 909 corresponding to the plot group 1201 among the unit characters within the character area 701 are originally desired to be white, i.e., (Cb, Cr)=(0, 0). However, for the same reason as that of the above-described variations, the color of the background of the reversed character area affects the character portion of the reversed unit character, and therefore, the average color C_ave of each of the unit characters (reversed unit characters) 901 to 909 is plotted in the position apart from the position where (Cb, Cr)=(0, 0). Then, in the plot group 1202, the character average colors of the unit characters in the second row to the last row within the character area 701 are plotted, and therefore, it is known that the number of plotted points that exist inside the plot group 1202 is larger than that in the plot group 1201. In the present embodiment, priority is given to an increase in speed of processing, and an example is shown in which a two-dimensional histogram of CbCr is created, but it may also be possible to create a three-dimensional histogram of YCbCr by giving priority to precision.

At step 1105, the representative color setting unit 104 extracts the candidate representative color C (n) of the unit character. Candidate representative color extraction processing will be described later.

At step 1106, the representative color setting unit 104 allocates a representative color for each unit character within the character area. Representative color allocation processing will also be described later.

At step 1107, the representative color setting unit 104 determines whether or not there exists a unit character to which a representative color has not been allocated yet. In the case where there exists a unit character to which a representative color has not been allocated yet (in the case where C_q (m) is NULL), the processing proceeds to step 1108. On the other hand, in the case where representative colors have been allocated to all the unit characters, the present processing is exited.

At step 1108, the representative color setting unit 104 increments (+1) the number of representative colors n. After the increment, the representative color setting unit 104 initializes the histogram that has been created in the preceding processing (step 1103) and creates a histogram of only the unit characters whose C_q (m) is NULL (step 1104). Then, the present processing is repeated until the unit character whose C_q (m) is NULL no longer exists.

The above is the contents of the representative color extraction processing. In the case where the character area 701 in FIG. 7 is the target of the processing, in the first routine (the number of representative colors n=1), to each unit character (each character in the second to ninth rows) whose character color is pale yellow, a representative color for which correction in accordance with the total number of pixels (the value obtained by totaling the numbers of pixels of the characters in the second to ninth rows) of the set of the unit characters has been performed is allocated. Then, in the second routine (the number of representative colors n=2), to each unit character (each character in the first row) whose color is white, a representative color for which correction in accordance with the total number of pixels (the value obtained by totaling the numbers of pixels of the characters in the first row) of the set of the unit characters has been performed is allocated as a result.

Explanation is returned to the flowchart in FIG. 10.

At step 1005, the representative color setting unit 104 reverses the color again by performing re-reversion processing on the partial binary image corresponding to the character area that is the target of the processing (reversed character area). This is the processing to return the character area to the original reversed character area after the representative color is allocated.

At step 1006, the representative color setting unit 104 performs the representative color extraction processing described previously on the processing-target character area (normal character area).

At step 1007, the representative color setting unit 104 determines whether or not there exists a character area on which the processing has not been performed yet. In the case where there exists a character area on which the processing has not been performed yet, the processing returns to step 1001, and the next character area is determined to be the processing-target character area and the processing at step 1002 to step 1007 is repeated. On the other hand, in the case where the processing for all the character areas has been completed, the present processing is exited.

The above is the contents of the representative color setting processing.

Next, details of the candidate representative color extraction processing (step 1105) and the representative color allocation processing (step 1106) described above are explained.

Figure 13:
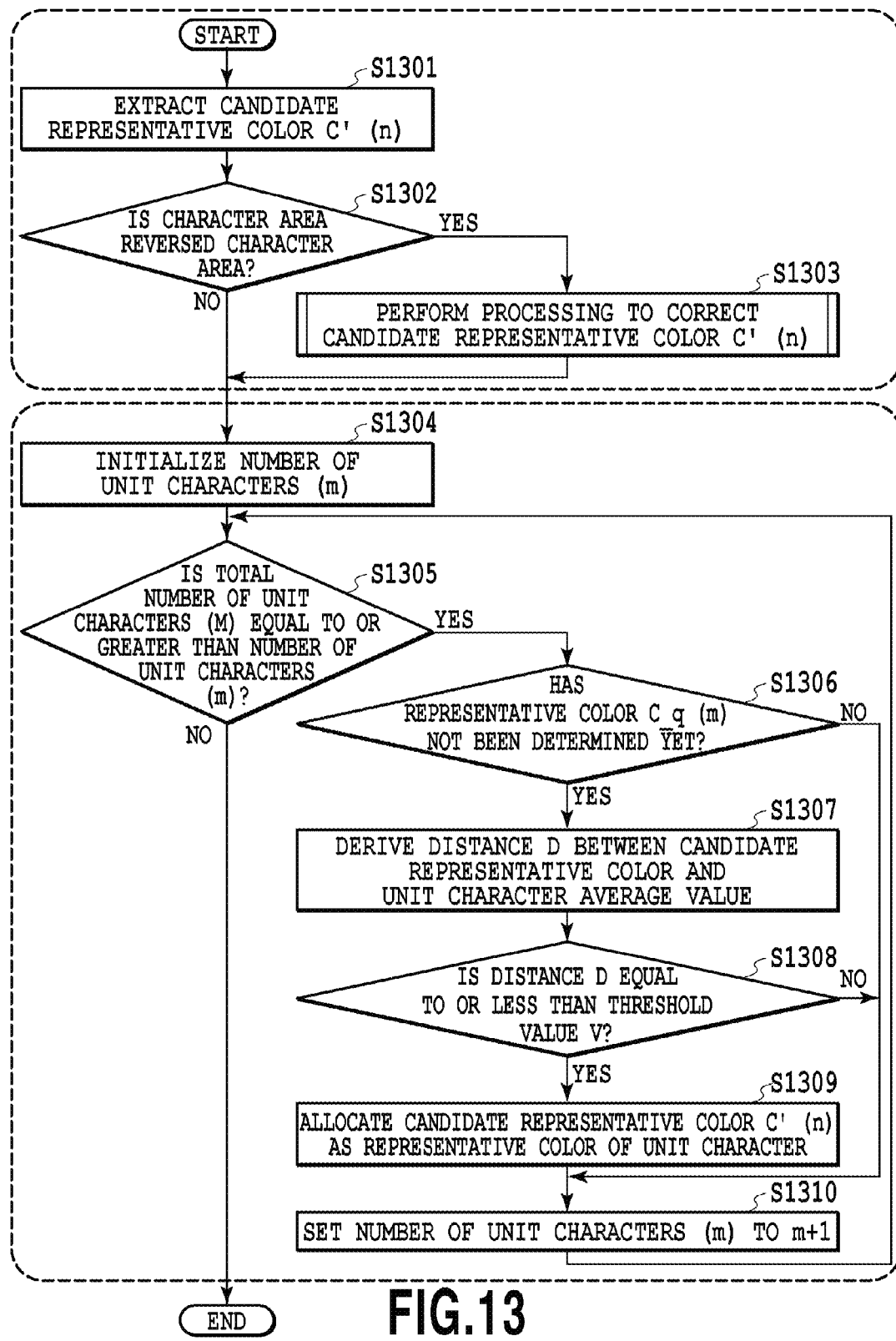
FIG. 13 is a flowchart showing details of candidate representative color extraction processing and representative color allocation processing.

FIG. 13 is a flowchart showing details of the candidate representative color extraction processing and the representative color allocation processing. In the flowchart in FIG. 13, the processing at steps 1301 to 1303 corresponds to the processing to extract the candidate representative color C' (n) of a unit character, and the processing at steps 1304 to 1310 corresponds to the processing to allocate a representative color for each unit character.

<Candidate Representative Color Extraction Processing>

Figure 14:
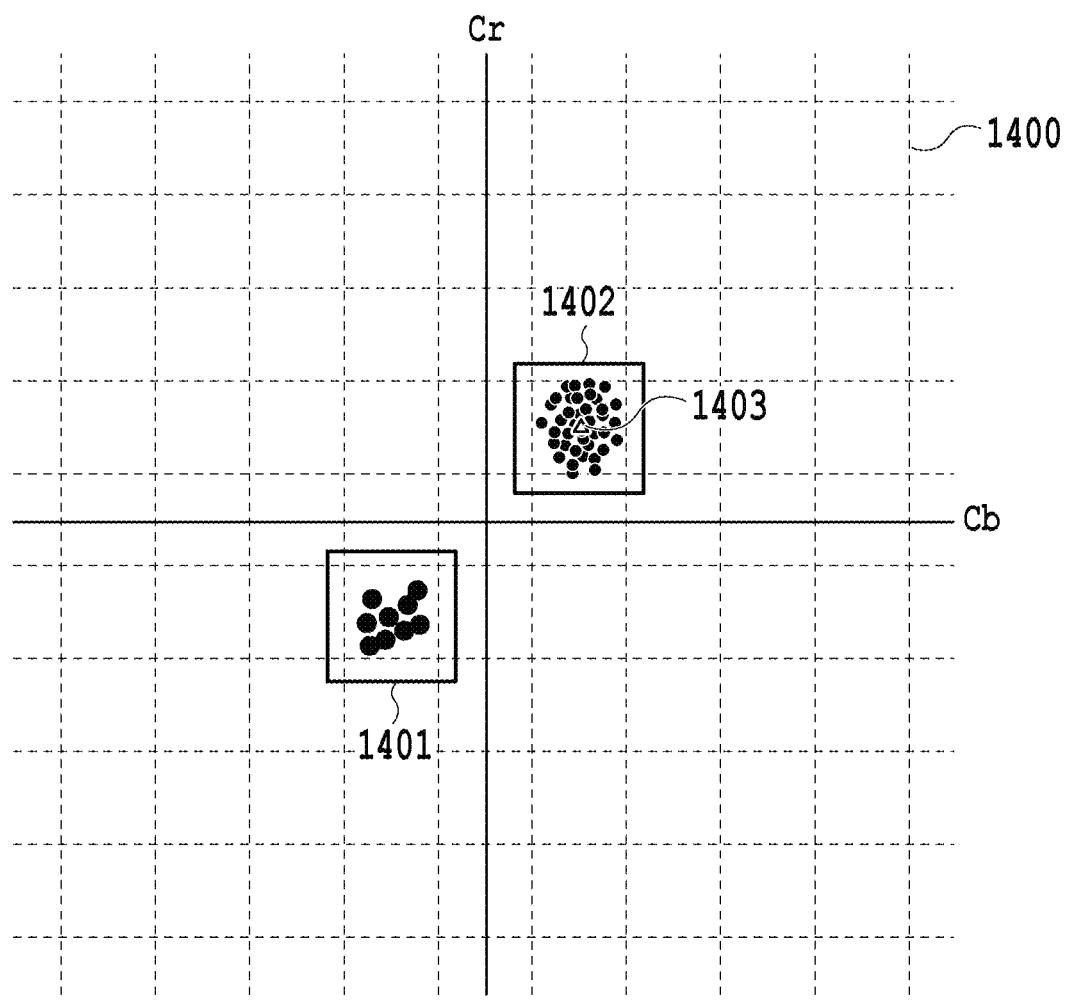
FIG. 14 is a diagram explaining an extraction method of a candidate representative color.

At step 1301, the representative color setting unit 104 extracts the candidate representative color C' (n), which is a candidate representative color that is allocated to a unit character. Here, n denotes the number of candidate representative colors and which is the same as the number of representative colors n. The candidate representative color C' (n) includes a Cb component and a Cr component and it is assumed that the Cb component in the nth candidate representative color is denoted by C' (n)_b and the Cr component in the nth candidate representative color is denoted by C' (n)_r. FIG. 14 is a diagram explaining an extraction method of the candidate representative color C' (n). In FIG. 14, grid lines 1400 indicated by the broken lines indicate areas set in advance and it is assumed that one representative value (Cb, Cr) is set in each area. The size of the area may be determined arbitrarily, and in the case where the size is reduced, the precision improves, but the processing efficiency reduces, and therefore, the setting is performed by taking into consideration the relationship of trade-off.

On the assumption that each of YCbCr is represented by 8 bits, respectively, in the present embodiment, the width in the vertical and horizontal directions of the area is set to 3 bits. Here, each area is scanned in the Cb-Cr direction and the maximum value of the number of plots within the area is acquired. There are a first area 1401 including the plot group 1201 described above and a second area 1402 including the plot group 1202 described above, and the maximum number of plots is obtained in the second area 1402, and therefore, a candidate representative color (Cb, Cr) indicated by a mark 1403 in the shape of Δ is obtained as a result. The first area 1401 and the second area 1402 in FIG. 14 are shown as a square one size larger than each area indicated by the grid lines 1400 for convenience of explanation. Here, the candidate representative color is determined from the maximum number of plots, but it may also be possible to calculate the candidate representative color anew from the plot groups 1201 and 1202.

Explanation is returned to the flowchart in FIG. 13.

At step 1302, the representative color setting unit 104 determines whether or not the processing-target character area is a reversed character area. In the case where the character area is a reversed character area, the processing proceeds to step 1303. On the other hand, in the case where the character area is not a reversed character area, the processing proceeds to step 1304. In the case where the processing-target character area is the reversed character area 701 in FIG. 7, the processing proceeds to step 1303 as a result.

Figure 15:
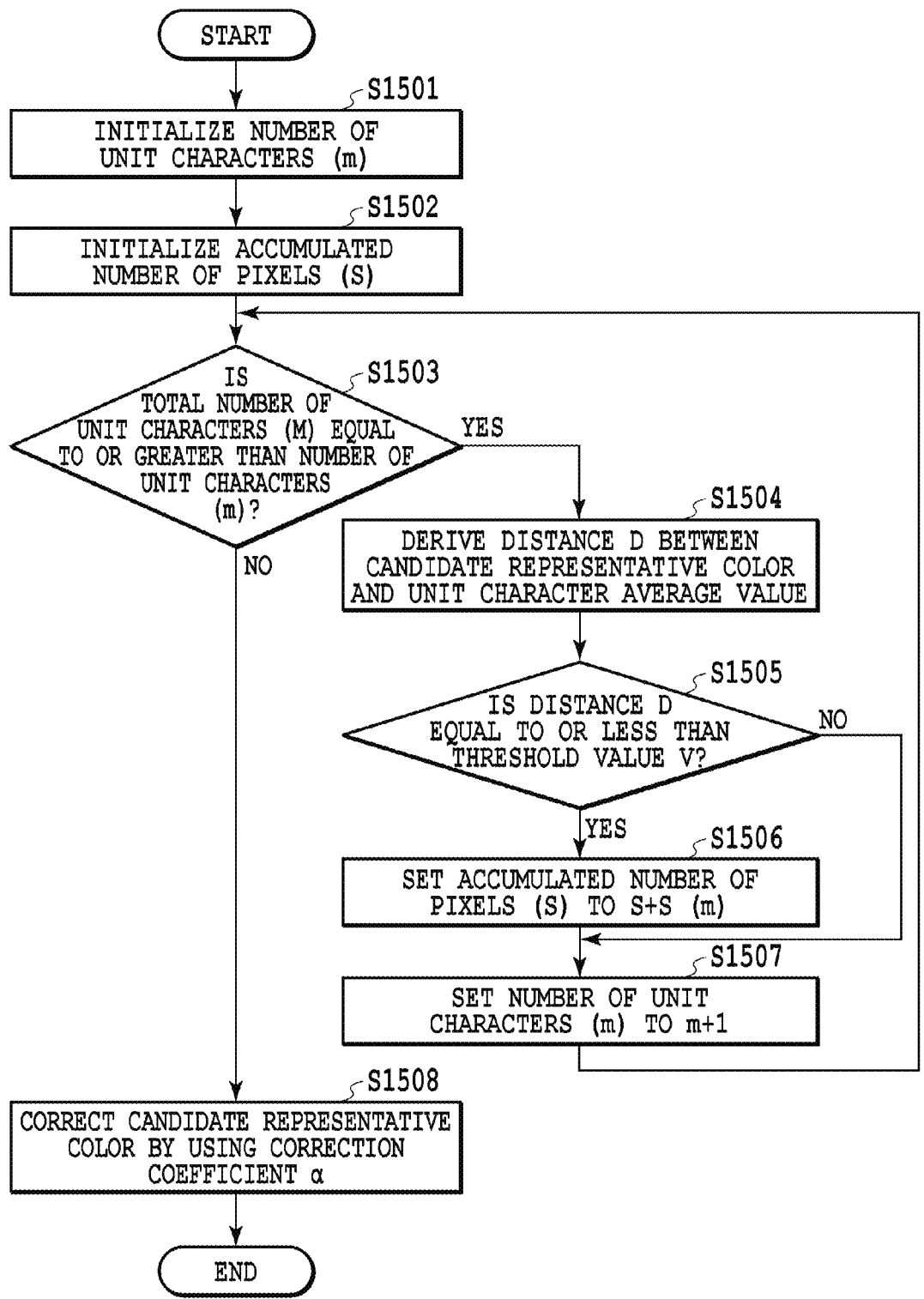
FIG. 15 is a flowchart showing details of candidate representative color extraction processing according to the first embodiment.

At step 1303, the representative color setting unit 104 adjusts the candidate representative color C' (n) extracted at step 1301. Specifically, the representative color setting unit 104 performs correction processing to adjust the balance between an increase in the visual recognizability by highlighting the character color and a reduction in the difference from the input image by keeping the original character color in the input image. This correction processing is performed by taking into the consideration a possibility that the candidate representative color extracted at step 1301 will be erroneously extracted because the character portion that should be originally white blurs, a possibility that the difference from the color in the original multivalued image will become large due to the highlighting processing and a feeling of unnaturalness will occur, etc. FIG. 15 is a flowchart showing details of the candidate representative color correction processing.

At step 1501, the representative color setting unit 104 initializes a variable (number of unit characters) m indicating the number of unit characters in the processing-target character area. Specifically, m=1 is set.

At step 1502, the representative color setting unit 104 initializes a variable (accumulated number of pixels) S for counting the number of pixels of a character. Specifically, S=0 is set.

At step 1503, the representative color setting unit 104 determines whether or not the value of the number of unit characters m is equal to or less than M. Here, M is the total number of unit characters in the processing-target character area. The case where the number of unit characters m is equal to or less than M means that there exists a unit character on which the processing has not been performed yet, and therefore, the processing proceeds to step 1504. On the other hand, the case where the number of unit characters m is greater than M means that the processing has been performed on all the unit characters within the character area, and therefore, the processing proceeds to step 1508. For example, in the case of the character area 701 in FIG. 7, M=74. Then, in the case where the value of the number of unit characters m is between 1 and 74, the processing proceeds to step 1504 and at the point of time of the value of the number of unit characters m reaching 75, the processing proceeds to step 1508 as a result.

At step 1504, the representative color setting unit 104 derives a distance D on the color space between the candidate representative color C' (n) extracted at step 1301 and the average color C_ave (m) of the unit character. Specifically, the distance D is calculated by expression (2) below.

$$D = \sqrt{(C'(n)\_b - C\_ave(m)\_b)^2 + (C'(n)\_r - C\_ave(m)\_r)^2}$$ expression (2)

At step 1505, the representative color setting unit 104 compares the distance D that is found and a threshold value v set in advance and determines whether or not the distance D that is found is equal to or less than the threshold value v. Here, the threshold value v is a threshold value for determining whether or not the average color C_ave (m) of the unit character is an approximate color of the candidate representative color C' (n) and is set to an arbitrary value. In the case where the distance D that is found is equal to or less than the threshold value v (i.e., in the case where the average color C_ave (m) of the unit character can be regarded as an approximate color of the candidate representative color C' (n)), the processing proceeds to step 1506. On the other hand, in the case where the distance D that is found is greater than the threshold value v, the processing proceeds to step 1507.

At step 1506, the representative color setting unit 104 adds the number of pixels S (m) of the unit character to the accumulated number of pixels S. It is possible to acquire the number of pixels of each unit character by referring to the character area information or the partial binary image.

At step 1507, the representative color setting unit 104 increments (+1) the number of unit characters m and returns to step 1503.

At step 1508, the representative color setting unit 104 corrects the candidate representative color based on the total number of pixels (accumulated number of pixels S) of the unit characters having the average color C_ave (m) that can be regarded as approximate to the candidate representative color. Specifically, the representative color setting unit 104 corrects the candidate representative color by multiplying each of the component C' (n)_b and the component C' (n)_r of the candidate representative color C' (n) by a correction coefficient α expressed by expression (3) below.

$$\alpha = \frac{S^2}{Sth} \quad \text{expression (3)}$$

In the above-described expression (3), "Sth" is a constant and Sth≥accumulated number of pixels S. Further, it is assumed that the range of α is 0<α≤1.0. The above-described correction coefficient α is set based on the design concept as follows.

In the case where the number of pixels of the unit characters having the average color C_ave (m) that can be regarded as approximate to the candidate representative color is large (in the case where the value of the accumulated number of pixels S is large), it can be thought that the unit characters are characters having a high ratio that accounts for the input image. In the case where a representative color that has been corrected to as to increase readability (corrected so as to become close to white as a predetermined color) is allocated to such unit characters, an apparent difference from the input image becomes large and a feeling of unnaturalness occurs. Because of this, in the case where the total number of pixels of the unit characters having the average color C_ave (m) that can be regarded as approximate to the candidate representative color is large, a correction coefficient that will reduce the degree of correction of the candidate representative color to a predetermined color (white) is set.

Conversely, in the case where the number of pixels of the unit characters having the average color C_ave (m) that can be regarded as approximate to the candidate representative color is small (in the case where the value of the accumulated number of pixels S is small), it can be thought that the unit characters are characters having a low ratio that accounts for the input image. In this case, priority is given to readability rather than the apparent difference from the input image and a correction coefficient that will increase the degree of correction of the candidate representative color to a predetermined color (white) is set. By setting the correction coefficient α in this manner, it is made possible to extract a representative color that keeps a balance between the "color difference from the input image" and "readability". For example, for the plot group 1202 (see FIG. 12 described previously), which is the results of plotting the color information of the pale yellow reversed character area 205, the correction coefficient α that will keep the pale yellow, which is the original color, as much as possible is set because the total number of pixels of the relevant unit characters is large. For the plot group 1201 (see FIG. 12 described previously), which is the results of plotting the color information of the white reversed character area 204, the correction coefficient α that will bring the candidate representative color close to the predetermined color (white) is set because the total number of pixels of the relevant unit characters is small.

The correction coefficient α is not limited to the example described above, and may be defined by using, for example, the number of unit characters. The correction coefficient α in this case is expressed by expression (4) below.

$$\alpha = \frac{cnt}{cnt\_th} \quad \text{expression (4)}$$

In the above-described expression (4), "cnt" is a variable indicating the accumulated number of the unit characters having the average color C_ave (m) that can be regarded as approximate to the candidate representative color within the processing-target character area and "cnt_th" is a constant and cnt_th≥accumulated number cnt. Similar to the above-described expression (3), it is assumed that the range of α is 0<α≤1.0. Because of this, it is possible to set the correction coefficient more easily.

The above is the contents of the candidate representative color extraction processing (including the candidate representative color correction processing).

Explanation is returned to the flowchart in FIG. 13.

<Representative Color Allocation Processing>

At step 1304, the representative color setting unit 104 initializes the number of unit characters m. Specifically, m=1 is set.

At step 1305, the representative color setting unit 104 determines whether or not the value of the number of unit characters m is equal to or less than M. As described above, M is the total number of unit characters in the processing-target character area. The case where the number of unit characters m is equal to or less than M means that a unit character on which the processing has not been performed yet exists, and therefore, the processing proceeds to step 1306. On the other hand, in the case where the number of unit characters m is greater than M, the present processing is exited.

At step 1306, the representative color setting unit 104 determines whether or not the representative color C_q (m) of the processing-target unit character has not been determined yet. In the case where the representative color C_q (m) has not been determined yet, the processing proceeds to step 1307. In the case where the representative color C_q (m) has already been determined, the processing proceeds to step 1311. In the stage immediately after the start of the processing, the representative color C_q (m) is not allocated to any unit character, and therefore, it is determined that the representative color C_q (m) has not been allocated yet and the processing proceeds to step 1307 as a result.

At step 1307, the representative color setting unit 104 derives the distance D on the color space between the candidate representative color C' (n) and the average color C_ave (m) of the unit character by using the expression (2) described above. At this time, in the case where the processing-target character area is a reversed character area, the C' (n) at this step will be the C' (n) corrected at step 1303 described above.

At step 1308, the representative color setting unit 104 compares the distance D that is found and the threshold value v set in advance and determines whether or not the distance D that is found is equal to or less than threshold value v. In the case where the distance D that is found is equal to or less than the threshold value v (i.e., in the case where the average color C_ave (m) of the unit character can be regarded as an approximate color of the candidate representative color C' (n)), the processing proceeds to step 1309. On the other hand, in the case where the distance D that is found is greater than the threshold value v, the processing proceeds to step 1310.

At step S1309, the representative color setting unit 104 allocates the candidate representative color C' (n) as the representative color C_q (m) of the processing-target unit character. In other words, C' (n)_b is substituted for C_q (m)_b and C' (n)_r is substituted for C_q (m)_r.

At step 1310, the representative color setting unit 104 increments (+1) the number of unit characters m and returns to step 1305.

For example, in the case where the character area 701 is the target of the processing, a color close to pale yellow is extracted as the candidate representative color C' (n) of the first color (step 1301). Because of this, in this routine, for the unit characters in the first row of the character area 701, it is determined that the distance D is greater than the threshold value v (No at step 1308), and therefore, the candidate representative color C' (n) is not set as the representative color (the processing proceeds to step 1310, skipping step 1309). On the other hand, for the unit characters in the second to ninth rows of the character area 701, it is determined that the distance D is equal to or less than the threshold value v (Yes at step 1308), and therefore, the candidate representative color C' (n) is set as the representative color (step 1309).

Then, a color close to white is extracted as the candidate representative color C' (n) of the second color (step 1301). Because of this, in this routine, for the unit characters in the first row of the character area 701, it is determined that the distance D is equal to or less than the threshold value v (Yes at step 1308), and therefore, the candidate representative color C' (n) is set as the representative color (step 1309). On the other hand, for the unit characters in the second to ninth rows of the character area 701, it is determined that the distance D is greater than the threshold value v (No at step 1308), and therefore, the candidate representative color C' (n) is not set as the representative color (the processing proceeds to step 1310, skipping step 1309).

The above is the contents of the representative color allocation processing.

In the case where the representative color is found from a two-dimensional histogram, the representative color that is obtained does not have the luminance component Y, and therefore, it is necessary to find the luminance component Y between the unit characters having the same representative color within the character area. Specifically, the luminance Y is found by using the expression (1) described previously based on the average value of the RGB color information of the pixels of the multivalued image corresponding to the pixels of a plurality of unit characters to which the same representative color C_q (m) is allocated within the character area. Further, in the case where the RGB information of the representative color is necessary, color space conversion from YCbCr into RGB is performed.

Figure 16:
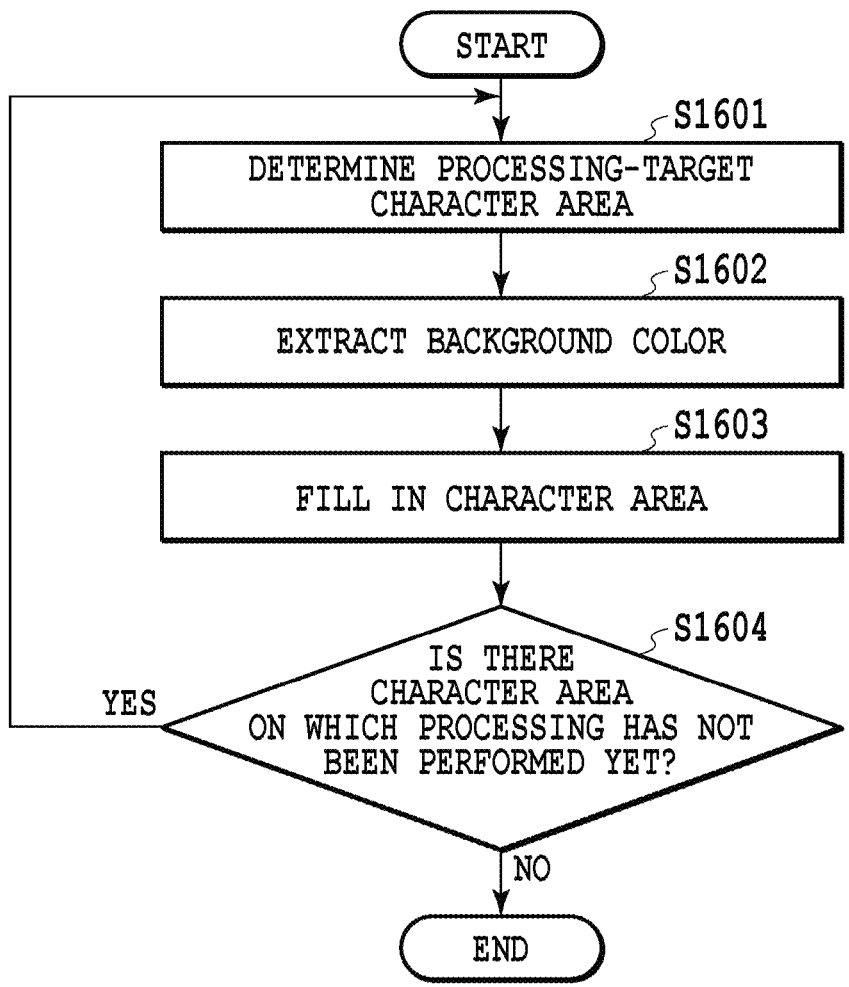
FIG. 16 is a flowchart showing a flow of character area filling processing.

Next, the character area filling processing in the character area filling unit 105 is explained. The character area filling processing is processing to fill in the pixels corresponding to the character in the input multivalued image by using the background color around the pixels and due to this processing, the compression ratio in the JPEG compression that is performed later improves. FIG. 16 is a flowchart showing a flow of the character area filling processing. The contents to be described below are implemented by the CPU reading programs stored in the hard disk or the like onto the RAM and executing the programs.

At step 1601, the character area filling unit 105 determines a character area that is the target of the processing.

At step 1602, the character area filling unit 105 extracts the background color within the processing-target character area. Specifically, by referring to the colors on the multivalued image corresponding to the white pixel positions in the partial binary image corresponding to the character area, the average value of the colors is found and the color having the obtained average value is extracted as the background color within the character area. The method of causing the coordinates of the partial binary image to correspond to the coordinates of the multivalued image has been explained in relation to the representative color setting unit 104, and therefore, explanation is omitted here.

At step 1603, the character area filling unit 105 fills in the processing-target character area by using the extracted background color. Specifically, the character area filling unit 105 allocates the extracted background color to the character area of the multivalued image.

At step 1604, the character area filling unit 105 determines whether or not there exists a character area on which the processing has not been performed yet. In the case where there exists a character area on which the processing has not been performed yet, the processing returns to step 1601 and next character area is determined to be the processing-target character area, and the processing at step 1602 to step 1604 is repeated. On the other hand, in the case where the processing has been completed for all the character areas, the present processing is exited.

The above is the contents of the character area filling processing.

Figure 17:
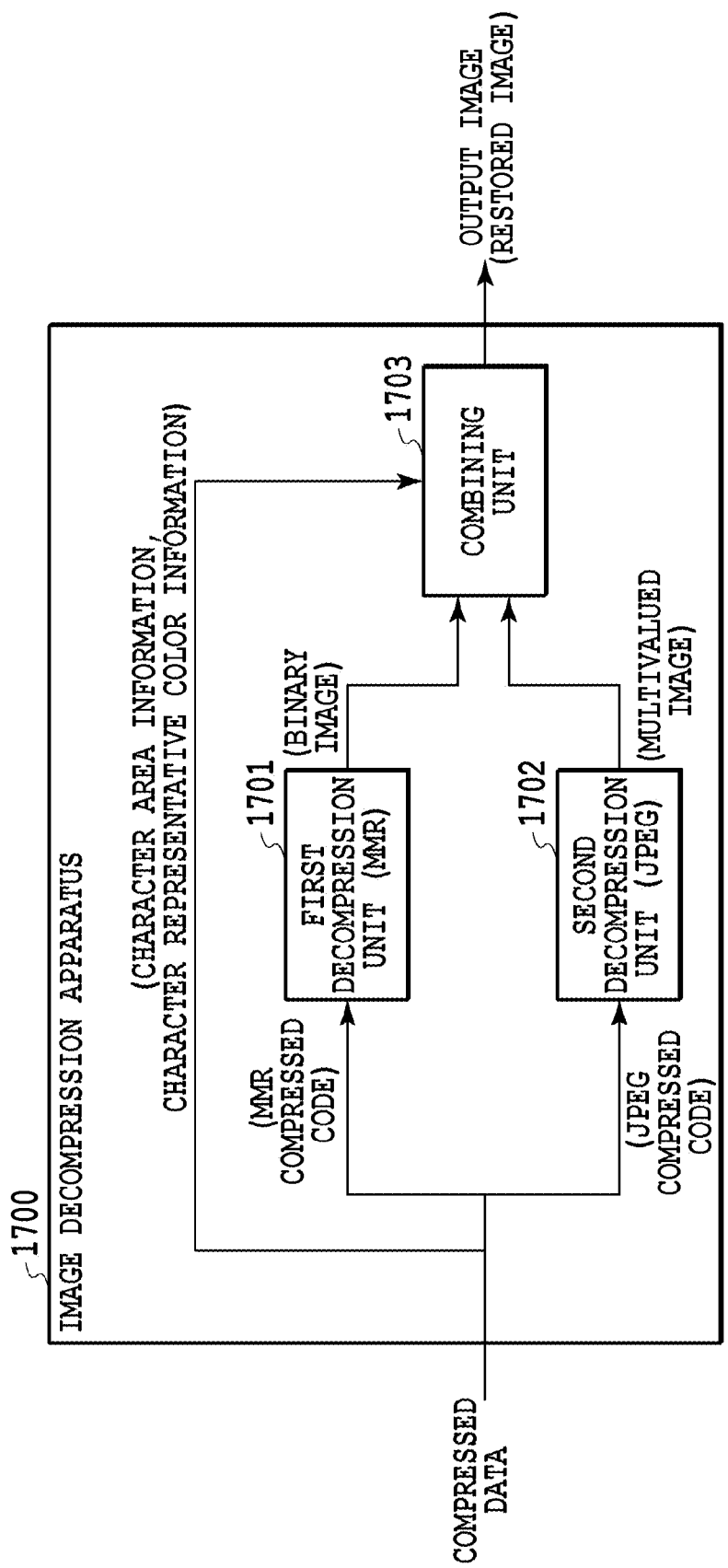
FIG. 17 is a function block diagram showing an internal configuration of an image processing apparatus as an image decompression apparatus.

Next, an image decompression apparatus that decompresses compressed data generated by the image compression apparatus as described above is explained. FIG. 17 is a function block diagram showing an internal configuration of an image processing apparatus as an image decompression apparatus according to the present embodiment. An image decompression apparatus 1700 includes a first decompression unit 1701, a second decompression unit 1702, and a combining unit 1703.

The first decompression unit 1701 performs MMR decompression processing on the MMR compressed code of the input compressed data and generates a binary image.

The second decompression unit 1702 performs JPEG decompression processing on the JPEG compressed code of the input compressed data and generates a multivalued image.

The combining unit 1703 refers to the character area information and the character representative color information included in the input compressed data and generates a decompressed image, which is the final restored image, based on the binary image received from the first decompression unit 1701 and the multivalued image received from the second decompression unit 1702. Specifically, the combining unit 1703 allocates the representative color in each character area to each black pixel of the corresponding unit character in the binary image and performs combining by superimposing the binary image to which the representative color is allocated on the multivalued image. At the time of the combining, the white pixel of the binary image shows through the multivalued image.

In this manner, the compressed data generated by the image compression apparatus is restored and a decompressed image is obtained.

As explained above, according to the present embodiment, it is made possible to keep a balance between improvement in the visual recognizability by highlighting the character color for the reversed character area and a reduction in the apparent difference between the compressed image and the restored image.

Further, it is possible to reproduce a restored image that favorably maintains the quality of the input image (in particular, the quality of the reversed character area).

Second Embodiment

Next, an aspect is explained as a second embodiment, in which the correction coefficient α is set by using information on a rectangle that circumscribes a unit character in the adjustment processing of the candidate representative color. Explanation of the contents in common to those of the first embodiment is omitted and in the following, the points different from the first embodiment are explained mainly.

Figure 18:
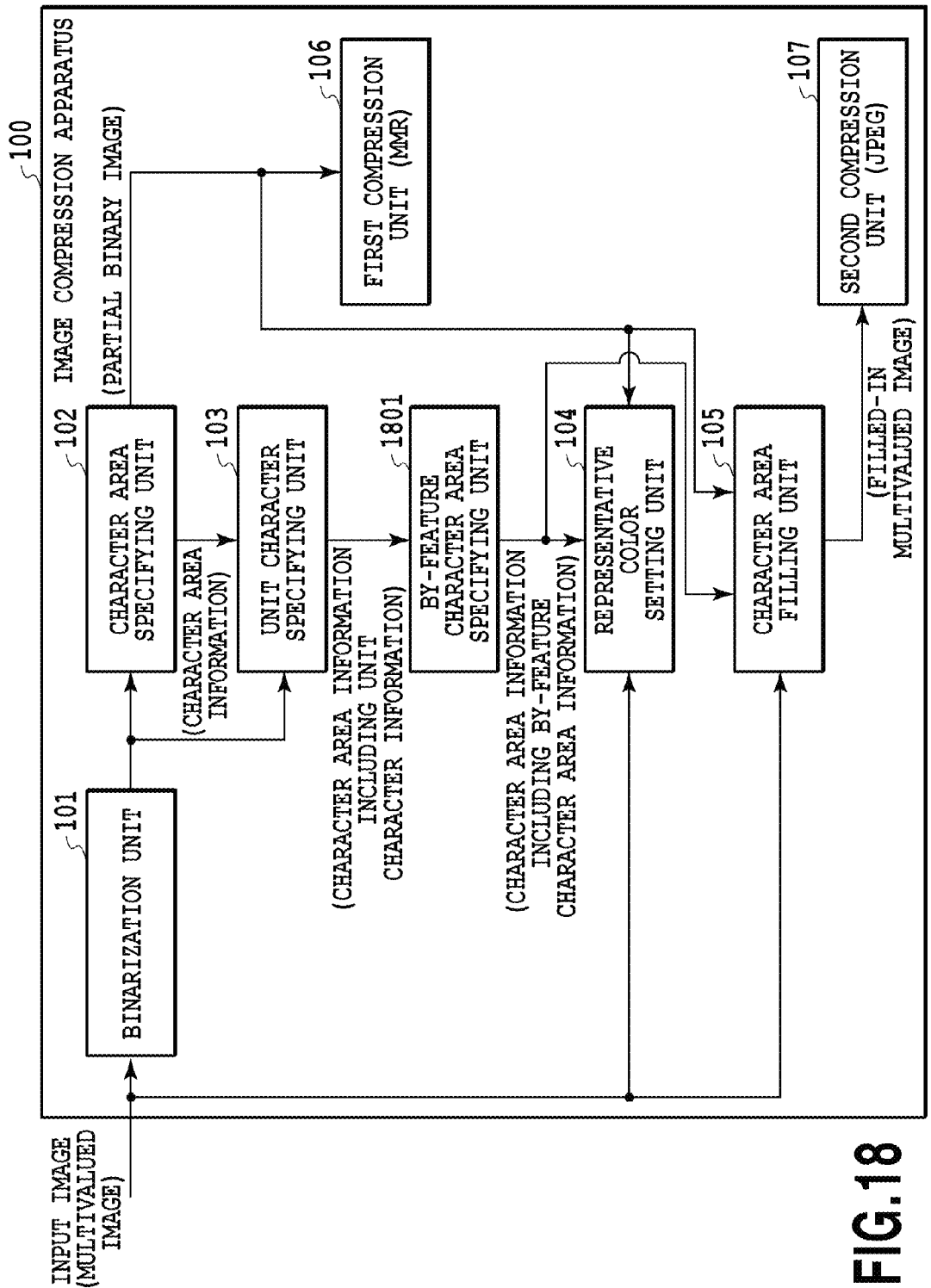
FIG. 18 is a function block diagram showing an internal configuration of an image processing apparatus as an image compression apparatus according to a second embodiment.

FIG. 18 is a function block diagram showing an internal configuration of the image processing apparatus as an image compression apparatus that compresses a multivalued image read by a scanner or the like according to the present embodiment. The image compression apparatus 100 includes the binarization unit 101, the character area specifying unit 102, the unit character specifying unit 103, a by-feature character area specifying unit 1801, the representative color setting unit 104, the character area filling unit 105, the first compression unit 106, and the second compression unit 107. The internal configuration in FIG. 18 is the same as the internal configuration shown in FIG. 1 according to the first embodiment except in that the by-feature character area specifying unit 1801 is added.

Figure 19:
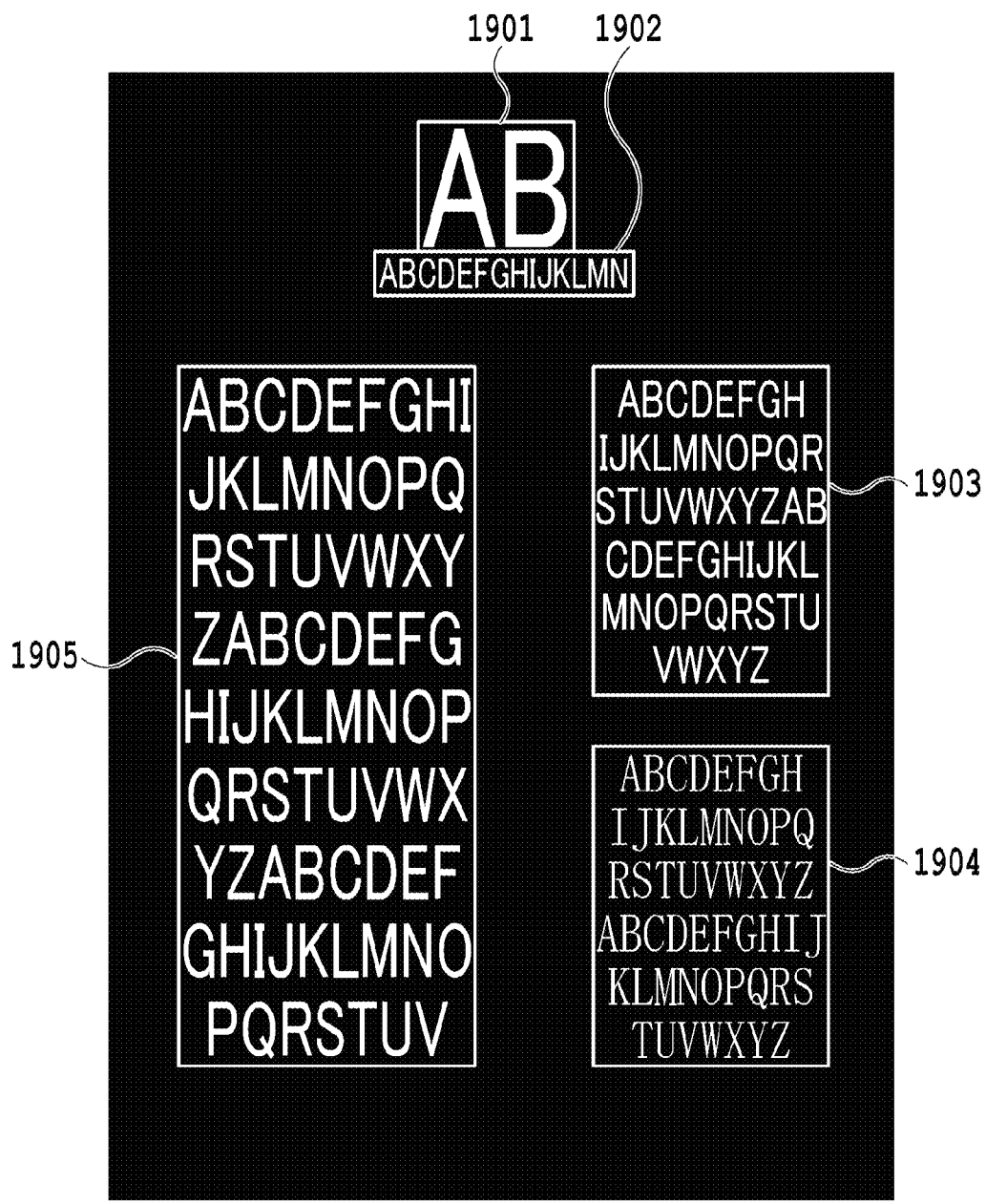
FIG. 19 is a diagram showing an example of a character area that is set again by feature.

The by-feature character area specifying unit 1801 sets the character area again by feature based on the feature of each unit character specified by the unit character specifying unit 103. Here, examples of the feature of a unit character are information on the height and width of a rectangle that circumscribes the unit character and information about the character font such as the kind of font. In this case, it may also be possible to identify the font by separately using a recognition module. The character area specifying information that is set again by feature (including the information indicative of the feature, and hereinafter, by-feature character area information) is added to the character area information. FIG. 19 is a diagram showing an example of character areas that are set again by feature. The character area (reversed character area) 702 shown in FIG. 7 described previously is divided into by-feature character areas 1901 and 1902 by the difference in the height of the rectangle that circumscribes the unit character. Similarly, the character area 703 shown in FIG. 7 described previously is divided into by-feature character areas 1903 and 1904 by the difference in the font of the unit character. A by-feature character area 1905 corresponds to the character area 701 as it is.

Figure 20:
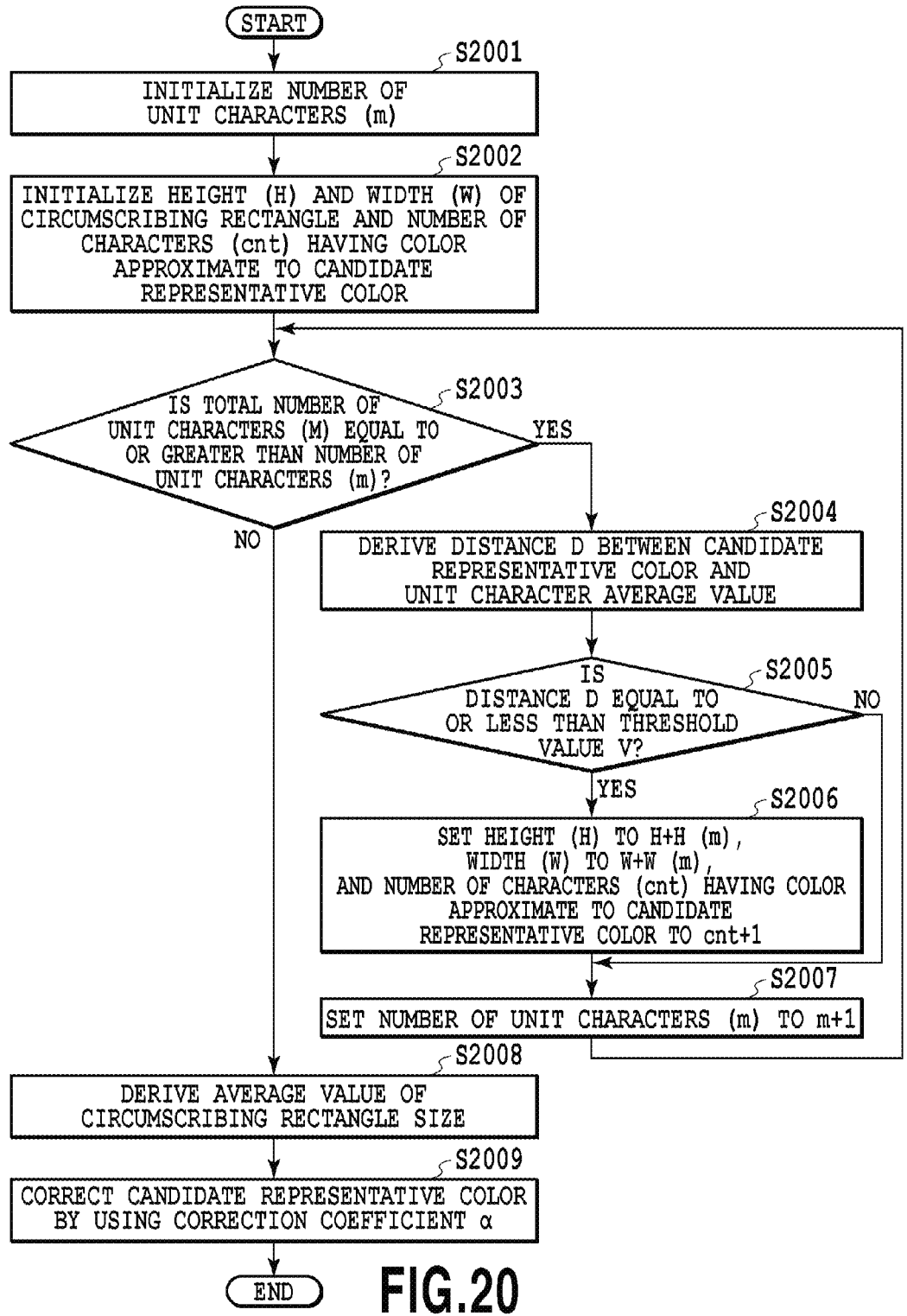
FIG. 20 is a flowchart showing details of candidate representative color correction processing according to the second embodiment.

FIG. 20 is a flowchart showing details of the candidate representative color correction processing according to the present embodiment, corresponding to the flowchart in FIG. 15 in the first embodiment.

At step 2001, the representative color setting unit 104 initializes the variable (number of unit characters) m indicating the number of unit characters in the processing-target character area as in the case of step 1501 in FIG. 15. Specifically, m=1 is set.

At step 2002, the representative color setting unit 104 initializes three variables: a variable H representing the height of a circumscribing rectangle of a unit character, a variable W representing the width of the circumscribing rectangle of the unit character, and a variable cnt for counting the unit characters having the average color C_ave (m) that can be regarded as approximate to the candidate representative color. Specifically, H=W=cnt=0 is set.

At step 2003, the representative color setting unit 104 determines whether or not the value of the number of unit characters m is equal to or less than M as in the case of step 1503 in FIG. 15. In the case where the number of unit characters m is equal to or less than M, the processing proceeds to step 2004. On the other hand, in the case where the number of unit characters m is greater than M, the processing proceeds to step 2008.

At step 2004, the representative color setting unit 104 finds the distance D on the color space between the candidate representative color C' (n) extracted at step 1301 and the average color C_ave (m) of the processing-target unit character as in the case of step 1504 in FIG. 15.

At step 2005, the representative color setting unit 104 compares the distance D that is found and the threshold value v set in advance and determines whether or not the distance D that is found is equal to or less than the threshold value v as in the case of step 1505 in FIG. 15. In the case where the distance D that is found is equal to or less than the threshold value v (i.e., in the case where the average color C_ave (m) of the unit character can be regarded as an approximate color of the candidate representative color C' (n)), the processing proceeds to step 2006. On the other hand, in the case where the distance D that is found is greater than the threshold value v, the processing proceeds to step 2007.

At step 2006, the representative color setting unit 104 adds the height H (m) and the width W (m) of the unit character having the average color C_ave (m) that can be regarded as approximate to the candidate representative color to H and W, respectively. Further, the representative color setting unit 104 increments (+1) the variable cnt.

At step 2007, the representative color setting unit 104 increments (+1) the number of unit characters m and returns to step 2003.

At step 2008, the representative color setting unit 104 derives an average value S_box of the size of the circumscribing rectangle of the unit character. The average value S_box may be found by, for example, expression (5) below.

$$S\_box = (H/cnt) \times (W/cnt) \qquad \text{expression (5)}$$

At step 2009, the representative color setting unit 104 corrects the candidate representative color based on the average value S_box of the circumscribing rectangle of the unit character, the color of which can be regarded as approximate to the candidate representative color. Specifically, the representative color setting unit 104 corrects the candidate representative color by multiplying C' (n)_b and C' (n)_r, which are the components of the candidate representative color C' (n), respectively, by the correction coefficient α expressed by expression (6) below.

$$\alpha = \frac{(S\_box)^2}{S\_box\_th} \qquad \text{expression (6)}$$

In the above-described expression (6), "S_box_th" is a constant and S_box_th≥S. It is assumed that the range of α is 0<α≤1.0. The above-described correction coefficient α is set based on the design concept as follows.

In the case where the average value of the circumscribing rectangle size in the unit characters having the average color C_ave (m) that can be regarded as approximate to the candidate representative color is large, it can be thought that the unit characters are characters that occupy a large size in the input image. In this case, on a condition that a representative color that has been corrected so as to increase readability (corrected so as to become close to a predetermined color (white)) is allocated to such unit characters, an apparent difference from the input image becomes large and a feeling of unnaturalness occurs. Because of this, in the case where the average value of the circumscribing rectangle size in the unit characters, whose colors can be regarded as approximate to the candidate representative color, is large, a correction coefficient that will reduce the degree of correction of the candidate representative color to a predetermined color (white) is set.

Conversely, in the case where the average value of the circumscribing rectangle size in the unit characters having the average color C_ave (m) that can be regarded as approximate to the candidate representative color is small, it can be thought that the unit characters are characters that occupy a small size in the input image. In this case, priority is given to readability rather than the apparent difference from the input image and a correction coefficient that will increase the degree of correction of the candidate representative color to a predetermined color (white) is set. By setting the correction coefficient $\alpha$ in this manner, it is made possible to extract a representative color that keeps a balance between the "color difference from the input image" and "readability". For example, the circumscribing rectangle size of the by-feature character area 1901 corresponding to the character area 202 whose color information is pale red is sufficiently large, and therefore, the correction coefficient $\alpha$ that will keep the pale red, which is the original color, is set as a result. In contrast to this, the circumscribing rectangle size of the by-feature character area 1902 corresponding to the character area 203 whose color information is also pale red is small, and therefore, priority is given to readability and the correction coefficient $\alpha$ that will bring the representative color close to a predetermined color (white) is set as a result.

The above is the contents of the candidate representative color correction processing.

According to the present embodiment, by setting a character representative color that keeps the original character color as much as possible for a large character that is conspicuous on a document, it is made possible to keep a balance between improvement in visual recognizability by highlighting the character color and a reduction in the apparent difference between the input image and the restored image.

In the present embodiment, all the unit characters are handled without distinction, but the size of the circumscribing rectangle of a period or a comma largely differs from that of an upper-case alphabet. Because of this, it may also be possible to separately perform character recognition processing on each unit character and exclude characters having predetermined recognition results (e.g., characters determined to be a period or a comma) from the target of the addition processing at step 2006 described above.

Third Embodiment

Next, an aspect is explained as a third embodiment, in which the correction of a candidate representative color is controlled by using information on the font of a unit character. Explanation of the contents in common to those of the first and second embodiments is omitted and in the following, the points different from the first embodiment are explained mainly.

Figure 21:
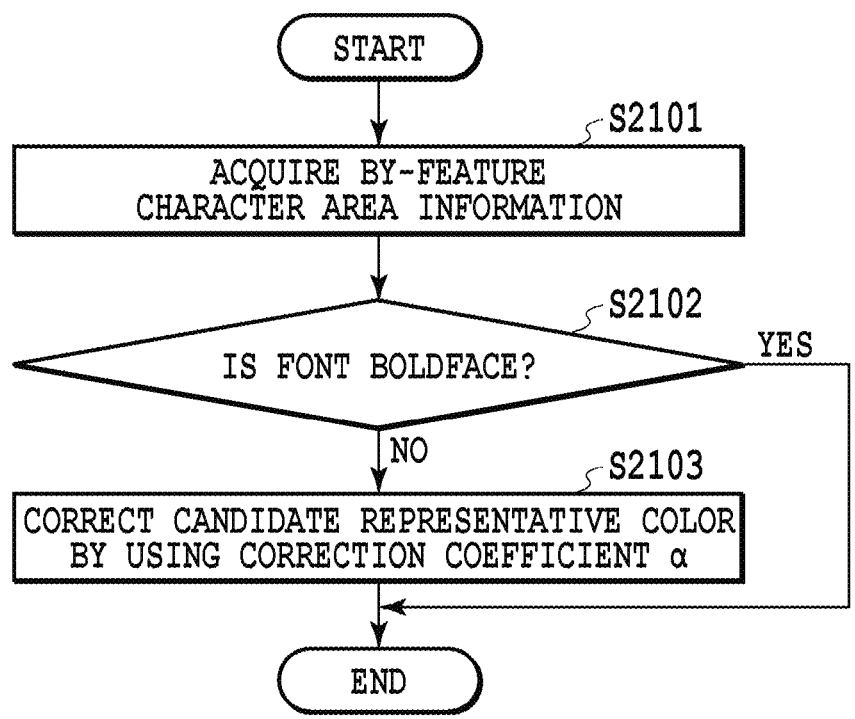
FIG. 21 is a flowchart showing a flow of candidate representative color correction processing according to a third embodiment.

FIG. 21 is a flowchart showing a flow of the candidate representative color correction processing according to the present embodiment.

At step 2101, the representative color setting unit 104 acquires character area information on the processing-target character area. As described previously, the character area information that is acquired here includes the above-described by-feature character area information and one of the features of a unit character, information about the font of the unit character is included.

At step 2102, the representative color setting unit 104 determines whether the font of the processing-target unit character is boldface based on the information about the font included in the acquired by-feature character area information. In the case where the font of the unit character is not boldface, the processing proceeds to step 2103. On the other hand, in the case where the font of the unit character is boldface, the present processing is exited.

At step 2103, the representative color setting unit 104 corrects the candidate representative color by using the correction coefficient $\alpha$. It is assumed that the correction coefficient $\alpha$ in this case is an arbitrary constant and the range of the correction coefficient $\alpha$ is $0<\alpha \leq 1.0$.

The above is the contents of the candidate representative color correction processing according to the present embodiment. The candidate representative color correction processing in the present embodiment is based on the design concept as follows.

The character that is represented in boldface is a character that is conspicuous in the input image, and therefore, priority is given to the reduction in the apparent difference from the input image and the correction using the correction coefficient $\alpha$ is not performed (the candidate representative color is used as it is).

On the other hand, the character that is represented in a normal font other than boldface is not so conspicuous in the input image, and therefore, priority is given to readability and the candidate representative color is corrected to a predetermined color close to white by using a correction coefficient that will make easier-to-see the character that is, for example, blurred and permeated with the background color.

It may also be possible to set the correction coefficient $\alpha$ for each kind of font.

According to the present embodiment, it is made possible to set a representative color that will keep the original character color for the character in a font that is highlighted so as to become conspicuous on a document.

Modification Example

As a modification example of the above-described embodiment, it may also be possible to use the information on the multivalued image (in more detail, the information on the resolution) that is used to determine a candidate representative color. In this case, it is sufficient to design the candidate representative color correction processing based on the design concept as follows.

In the case where the resolution is high, it can be thought that the multivalued image keeps the original character color as it is, and therefore, the candidate representative color is allocated as it is as the representative color of the unit character as in the case where the font is boldface.

On the other hand, in the case where the resolution is low, it can be thought that there are many cases in which the character is blurred and permeated with the background color, and therefore, the candidate representative color is corrected to a predetermined color close to white as in the case where the font is not boldface.

As above, according to the present embodiment, it is made possible to set the correction coefficient of the candidate representative color more easily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076079, filed Apr. 2, 2014, which is hereby incorporated by reference wherein in its entirety.

What is claimed is:

1. an image processing apparatus comprising:
a processor and a memory; a specifying unit configured to specify a character within an image;
a setting unit configured to determine a representative color for the specified character based on colors of pixels constituting the specified character in the image;
a determination unit configured to determine whether the specified character is a reversed character; and
a correction unit configured to correct the representative color determined by the setting unit if the determination unit determines that the specified character is a reversed character,
wherein the correction unit does not correct the representative color determined by the setting unit if the determination unit determines that the specified character is not a reversed character,
wherein the processor and memory cooperate to function as the specifying unit, the setting unit, the determination unit and the correction unit.

2. The image processing apparatus according to claim 1, wherein the correction unit performs the correction by using a correction coefficient based on information about the specified character.

3. The image processing apparatus according to claim 2, wherein:
the specifying unit specifies a character area within the image and specifies the character in the specified character area, and
the correction coefficient is determined based on the number of pixels of the specified character that is included in the specified character area.

4. The image processing apparatus according to claim 3, wherein, the setting unit extracts, from the specified character area, the representative color for the specified character that is included in the specified character area, and
wherein, the number of pixels of the specified character that is included in the specified character area is the total number of pixels of a character having an average color that can be regarded as approximate to the representative color extracted from the specified character area, and
wherein, in a case where the total number of pixels is small, a correction coefficient that increases readability of the specified character is used.

5. The image processing apparatus according to claim 4, wherein whether the specified character has an average color that can be regarded approximate to the representative color extracted from the specified character area is determined by using a distance on a color space between the representative color and the average color of the specified character.

6. The image processing apparatus according to claim 2, wherein:
the specifying unit specifies a character area within the image and specifies the character in the specified character area, and
the correction coefficient is determined based on the number of specified characters that are included in the specified character area.

7. The image processing apparatus according to claim 6, wherein, the setting unit extracts, from the specified character area, the representative color for the specified character that is included in the specified character area, and
wherein, the number of specified characters that are included in the specified character area is the number of characters having an average color that can be regarded approximate to the representative color extracted from the specified character area, and
wherein, in a case where the number of characters is small, a correction coefficient that increases readability of the specified character is used.

8. The image processing apparatus according to claim 2, wherein:
the specifying unit specifies a character area within the image and specifies the character in the specified character area, and
the correction coefficient is determined based on the size of a circumscribing rectangle of the specified character that is included in the specified character area.

9. The image processing apparatus according to claim 8, wherein, the setting unit extracts, from the specified character area, the representative color for the specified character that is included in the specified character area, and wherein, the size of the circumscribing rectangle of the specified character is the size of a circumscribing rectangle of a character having an average color that can be regarded as approximate to the representative color extracted from the specified character area, and wherein, in a case where the size of the circumscribing rectangle is small, a correction coefficient that will increase readability of the specified character is used.

10. The image processing apparatus according to claim 1, wherein the correction unit determines the contents of the correction based on the font of the specified character.

11. The image processing apparatus according to claim 10, wherein the correction unit does not perform correction that will increase readability of the specified character in a case where the font of the specified character is boldface.

12. The image processing apparatus according to claim 10, wherein the correction unit performs the correction by using a correction coefficient in accordance with the kind of the font of the specified character.

13. The image processing apparatus according to claim 1, wherein the correction unit determines the contents of the correction based on the resolution of the image.

14. The image processing apparatus according to claim 13, wherein the correction unit does not perform correction that will increase readability of the specified character in a case where the resolution of the image is higher than a predetermined value.

15. An image processing method executed by a processor and a memory of an image processing apparatus, the method comprising the steps of: specifying a character within an image;
determining a representative color for the specified character based on colors of pixels constituting the specified character in the image;
determining whether the specified character is a reversed character;
and correcting the determined representative color if the specified character is determined to be a reversed character,
wherein the determined representative color is not corrected if the specified character is determined not to be a reversed character.

16. A non-transitory computer readable storage medium storing a program for causing a computer to perform an image processing method comprising the steps of:
specifying a character within an image;
determining a representative color for the specified character based on colors of pixels constituting the specified character in the image;
determining whether the specified character is a reversed character; and
correcting the determined representative color if the specified character is determined to be a reversed character,
wherein the determined representative color is not corrected if the specified character is determined not to be a reversed character.

17. An image processing apparatus comprising:
a processor and a memory;
a specifying unit configured to specify a character within an input image;
a setting unit configured to determine a representative color for the specified character based on colors of pixels constituting the character specified within the input image;
a determination unit configured to determine whether the specified character is a reversed character; and
a correction unit configured to correct the representative color determined for the reversed character if the determination unit determines that the specified character is the reversed character,
wherein the processor and the memory cooperate to function as the specifying unit, the setting unit, the determination unit and the correction unit.

18. An image processing method executed by a processor and a memory of an image processing apparatus, the method comprising the steps of:
specifying a character within an input image;
determining a representative color for the specified character based on colors of pixels constituting the character specified within the input image;
determining whether the specified character is a reversed character; and
correcting the representative color determined for the reversed character if it is determined that the specified character is the reversed character.

19. A non-transitory computer readable storage medium storing a program for causing a computer to perform an image processing method comprising the steps of:
specifying a character within an input image;
determining a representative color for the specified character based on colors of pixels constituting the character specified within the input image;
determining whether the specified character is a reversed character; and
correcting the representative color determined for the reversed character if it is determined that the specified character is the reversed character.

* * * * *